(12) United States Patent
Fu et al.

(10) Patent No.: US 10,097,833 B2
(45) Date of Patent: Oct. 9, 2018

(54) METHOD AND SYSTEM OF ENTROPY CODING USING LOOK-UP TABLE BASED PROBABILITY UPDATING FOR VIDEO CODING

(71) Applicant: Intel Corporation, Santa Clara, CA (US)

(72) Inventors: Fangwen Fu, Folsom, CA (US); Haihua Wu, San Jose, CA (US); Tuyet-Trang Lam Piel, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 14/583,534

(22) Filed: Dec. 26, 2014

(65) Prior Publication Data

US 2016/0191917 A1    Jun. 30, 2016

(51) Int. Cl.
*H04N 19/13* (2014.01)
*H04N 19/146* (2014.01)
*H04N 19/184* (2014.01)
H04N 19/70 (2014.01)

(52) U.S. Cl.
CPC ........... *H04N 19/13* (2014.11); *H04N 19/146* (2014.11); *H04N 19/184* (2014.11); *H04N 19/70* (2014.11)

(58) Field of Classification Search
None
See application file for complete search history.

(56) References Cited

U.S. PATENT DOCUMENTS

| 5,717,394 A | * | 2/1998 | Schwartz | H03M 7/4006 |
| | | | | 341/107 |
| 6,677,868 B2 | | 1/2004 | Kerofsky et al. | |
| 7,928,868 B1 | * | 4/2011 | Huang | H03M 7/4006 |
| | | | | 341/107 |
| 9,008,171 B2 | * | 4/2015 | Karczewicz | H04N 19/176 |
| | | | | 375/240.03 |
| 2008/0165036 A1 | | 7/2008 | Shima | |
| 2009/0224950 A1 | | 9/2009 | Xu | |
| 2012/0027084 A1 | | 2/2012 | Zhang | |
| 2012/0147948 A1 | | 6/2012 | Sole et al. | |

(Continued)

FOREIGN PATENT DOCUMENTS

| WO | 2011127423 A1 | 10/2011 |
| WO | 2012172115 A1 | 12/2012 |

OTHER PUBLICATIONS

International Search Report and Written Opinion for PCT/US2015/062722, dated Mar. 4, 2016, 11 pages.

(Continued)

*Primary Examiner* — Dave Czekaj
*Assistant Examiner* — Tyler W Sullivan
(74) *Attorney, Agent, or Firm* — Green, Howard & Mughal LLP.

(57) ABSTRACT

Techniques related to entropy coding with look-up-table based probability updating for video coding including setting a search range for candidate probabilities. This also involves selecting one of the candidate probabilities of the look-up table to update a previous probability for coding of a symbol, and selecting based on, at least in part, the bit-cost associated with updating the previous probability with at least one of the candidate probabilities.

23 Claims, 13 Drawing Sheets

(56) References Cited

U.S. PATENT DOCUMENTS

| | | | | |
|---|---|---|---|---|
| 2015/0334387 A1* | 11/2015 | Wang | .................... | H04N 19/423 |
| | | | | 375/240.02 |
| 2016/0373788 A1* | 12/2016 | Gamei | .................... | H04N 19/61 |
| 2017/0359591 A1* | 12/2017 | Said | .................... | H04N 19/436 |
| 2018/0139445 A1* | 5/2018 | Chuang | .................. | H04N 19/13 |

OTHER PUBLICATIONS

International Preliminary report on Patentability dated Jul. 6, 2017 for PCT Patent Application No. PCT/US15/62722.
Said, Amir, "Introduction to Arithmetic Encoding—Theory and Practice," HP Laboratories Palo Alto, HPL-2004-76, Apr. 21, 2004, 67 pages.
Mukherjee, Debargha, "A Technical Overview of VP-9: The latest royalty-free video codec from Google," 44 pages.
Witten, Ian H., et al., "Arithmetic Coding for Data Compression," Communications of the ACM, Jun. 1987, vol. 30, No. 6, 21 pages.
Pieter3D, "How VP9 works, technical details & diagrams," http://forum.doom9.org/showthread.php?t=168947, Oct. 8, 2013.

* cited by examiner

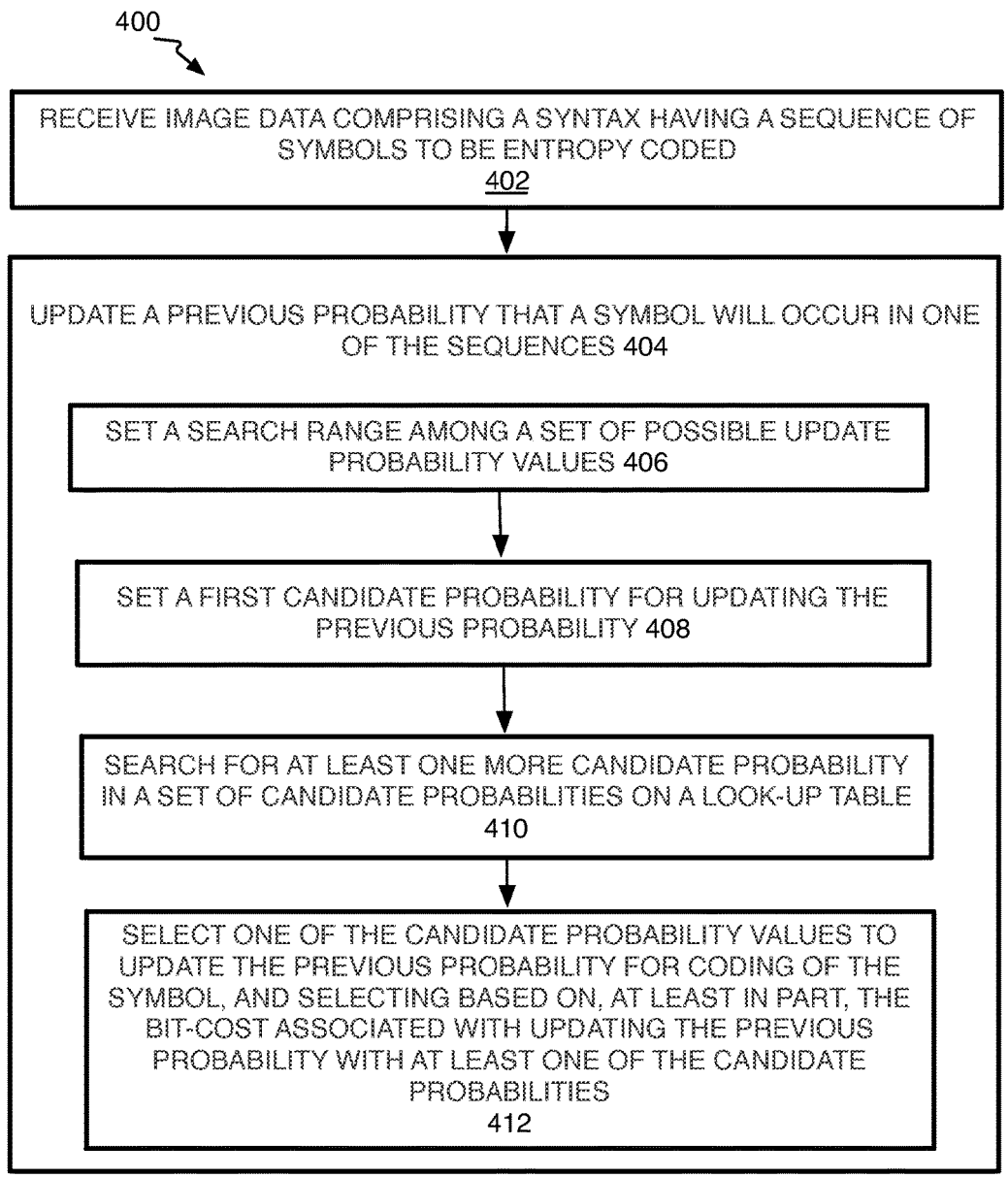

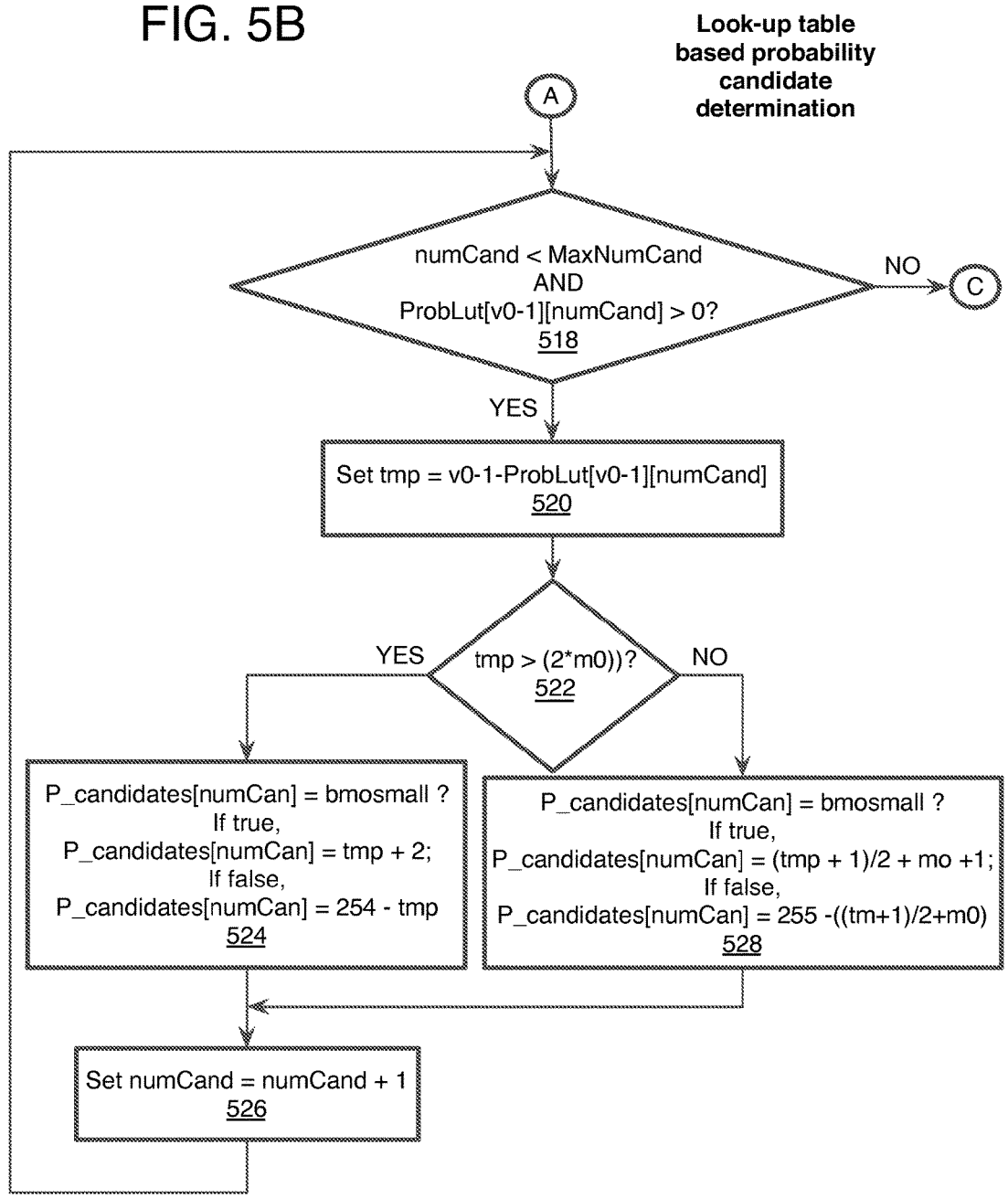

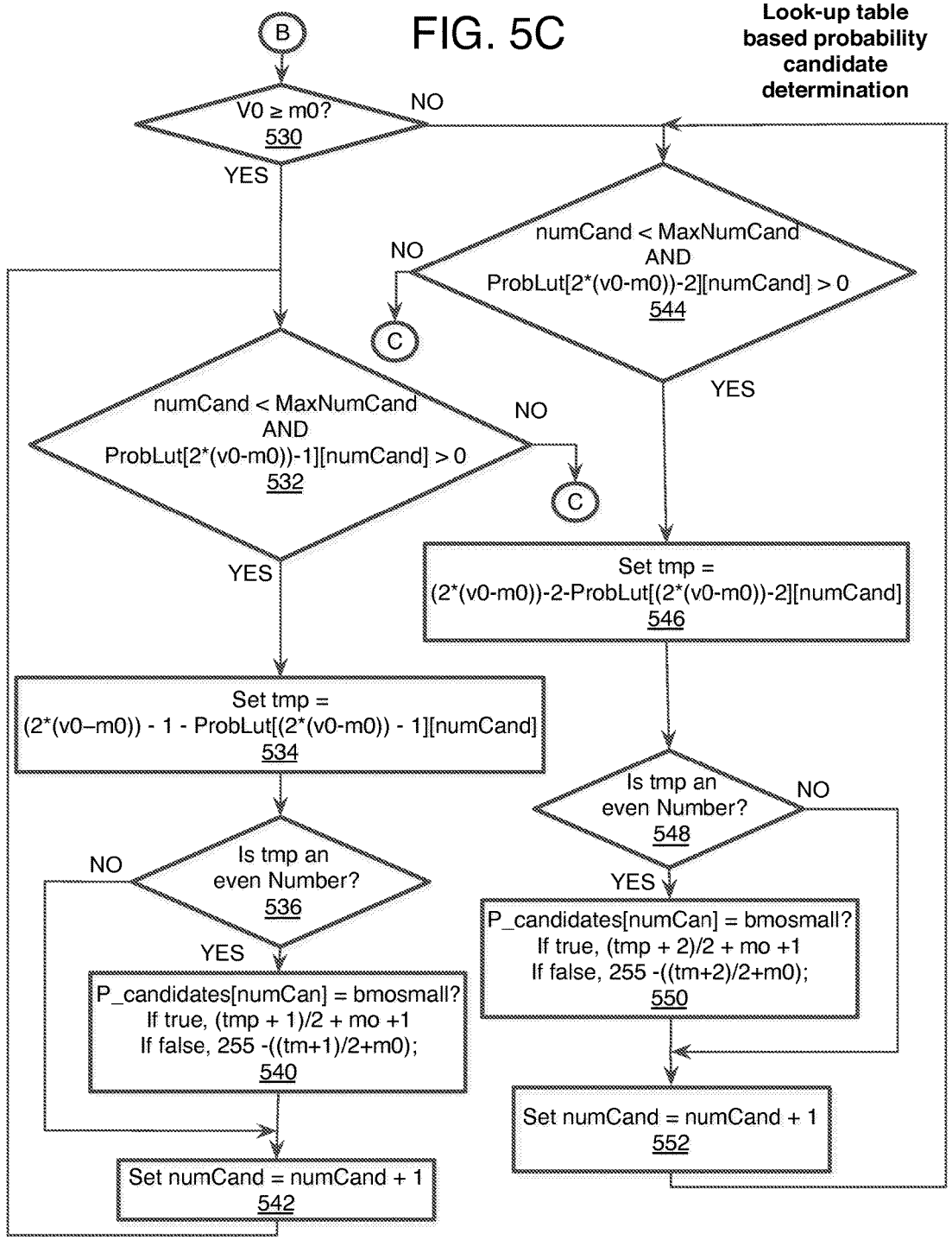

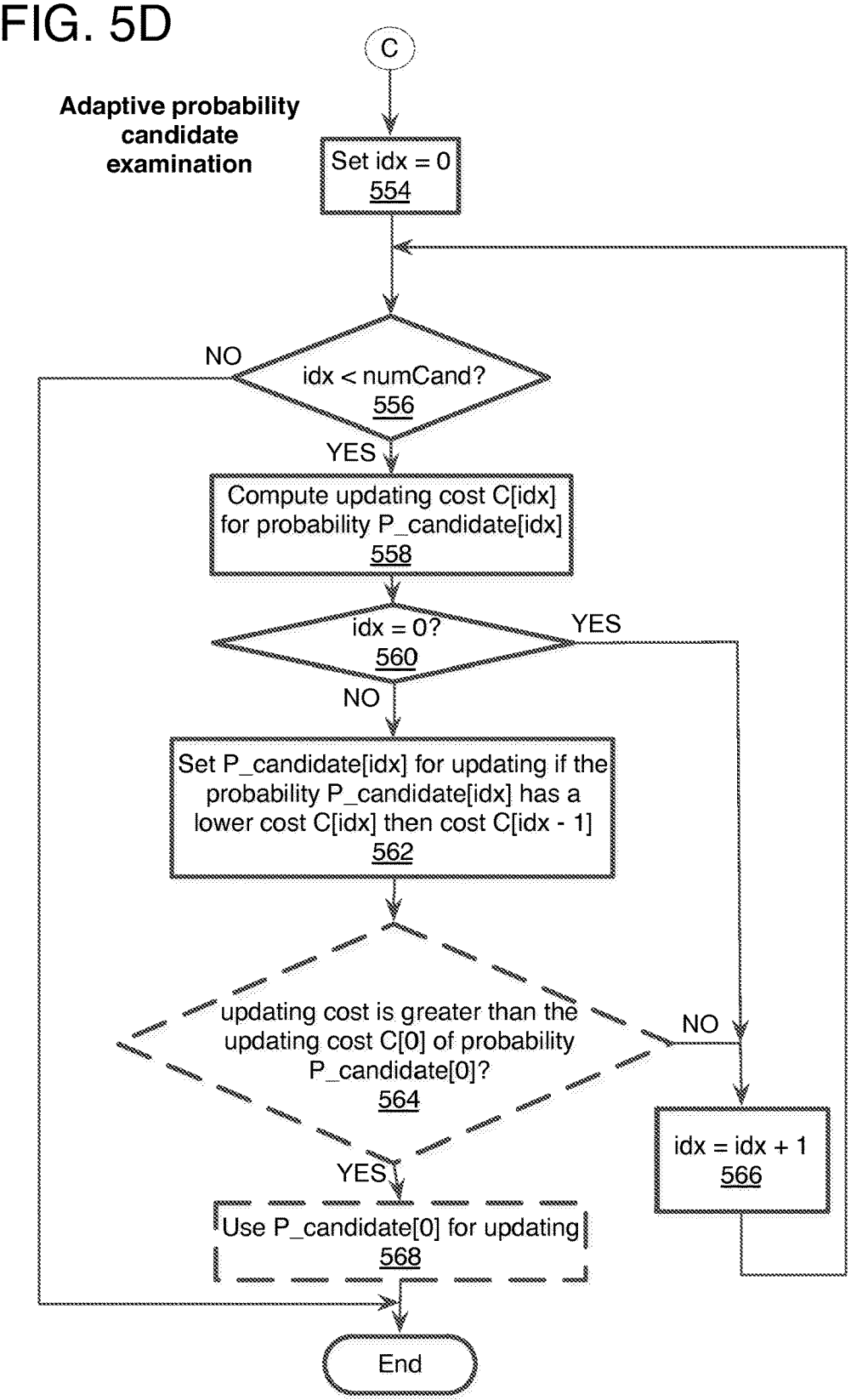

FIG. 7A

```
U8 ProbLut[254][3]  ={    {10,   8,    43},        {0,    0,    0},
           {0,    0,    0},      {11,   9,    44},        {1,    64,   99},
           {0,    0,    0},      {12,   10,   45},        {2,    65,   100},
           {0,    0,    0},      {0,    0,    0},         {3,    66,   101},
           {0,    0,    0},      {1,    12,   47},        {4,    67,   102},
           {0,    0,    0},      {2,    13,   48},        {5,    68,   103},
           {0,    0,    0},      {3,    14,   49},        {6,    69,   104},
           {1,    0,    0},      {4,    15,   50},        {7,    70,   105},
           {2,    0,    0},      {5,    16,   51},        {8,    0,    71},
           {3,    0,    0},      {6,    17,   52},        {9,    1,    72},
           {4,    0,    0},      {7,    18,   53},        {10,   2,    73},
           {5,    0,    0},      {8,    19,   54},        {11,   3,    74},
           {6,    0,    0},      {9,    20,   55},        {12,   4,    75},
           {7,    1,    0},      {10,   21,   56},        {0,    0,    0},
           {8,    2,    0},      {11,   22,   57},        {1,    6,    77},
           {9,    3,    0},      {12,   23,   58},        {2,    7,    78},
           {10,   4,    0},      {0,    0,    0},         {3,    8,    79},
           {11,   5,    0},      {1,    25,   60},        {4,    9,    80},
           {12,   6,    0},      {2,    26,   61},        {5,    10,   81},
           {0,    0,    0},      {3,    27,   62},        {6,    11,   82},
           {1,    8,    0},      {4,    28,   63},        {7,    12,   83},
           {2,    9,    0},      {5,    29,   64},        {8,    13,   84},
           {3,    10,   0},      {6,    30,   65},        {9,    14,   85},
           {4,    11,   0},      {7,    31,   66},        {10,   15,   86},
           {5,    12,   0},      {8,    32,   67},        {11,   16,   87},
           {6,    13,   0},      {9,    33,   68},        {12,   17,   88},
           {7,    14,   0},      {10,   34,   69},        {0,    0,    0 },
           {8,    15,   0},      {11,   35,   70},        {1,    19,   90},
           {9,    16,   0},      {12,   36,   71},        {2,    20,   91},
           {10,   17,   0},      {0,    0,    0},         {3,    21,   92},
           {11,   18,   0},      {1,    38,   73},        {4,    22,   93},
           {12,   19,   0},      {2,    39,   74},        {5,    23,   94},
           {0,    0,    0},      {3,    40,   75},        {6,    24,   95},
           {1,    21,   0},      {4,    41,   76},        {7,    25,   96},
           {2,    22,   0},      {5,    42,   77},        {8,    26,   97},
           {3,    23,   0},      {6,    43,   78},        {9,    27,   98},
           {4,    24,   0},      {7,    44,   79},        {10,   28,   99},
           {5,    25,   0},      {8,    45,   80},        {11,   29,   100},
           {6,    26,   0},      {9,    46,   81},        {12,   30,   101},
           {7,    27,   0},      {10,   47,   82},        {0,    0,    0 },
           {8,    28,   0},      {11,   48,   83},        {1,    32,   103},
           {9,    29,   0},      {12,   49,   84},        {2,    33,   104},
           {10,   30,   0},      {0,    0,    0},         {3,    34,   105},
           {11,   31,   0},      {1,    51,   86},        {4,    35,   106},
           {12,   32,   0},      {2,    52,   87},        {5,    36,   107},
           {0,    0,    0},      {3,    53,   88},        {6,    37,   108},
           {1,    34,   0},      {4,    54,   89},        {7,    38,   109},
           {2,    35,   0},      {5,    55,   90},        {8,    39,   110},
           {3,    1,    36},     {6,    56,   91},        {9,    40,   111},
           {4,    2,    37},     {7,    57,   92},        {10,   41,   112},
           {5,    3,    38},     {8,    58,   93},        {11,   42,   113},
           {6,    4,    39},     {9,    59,   94},        {12,   43,   114},
           {7,    5,    40},     {10,   60,   95},        {0,    0,    0},
           {8,    6,    41},     {11,   61,   96},        {1,    45,   116},
           {9,    7,    42},     {12,   62,   97},        {2,    46,   117},
```

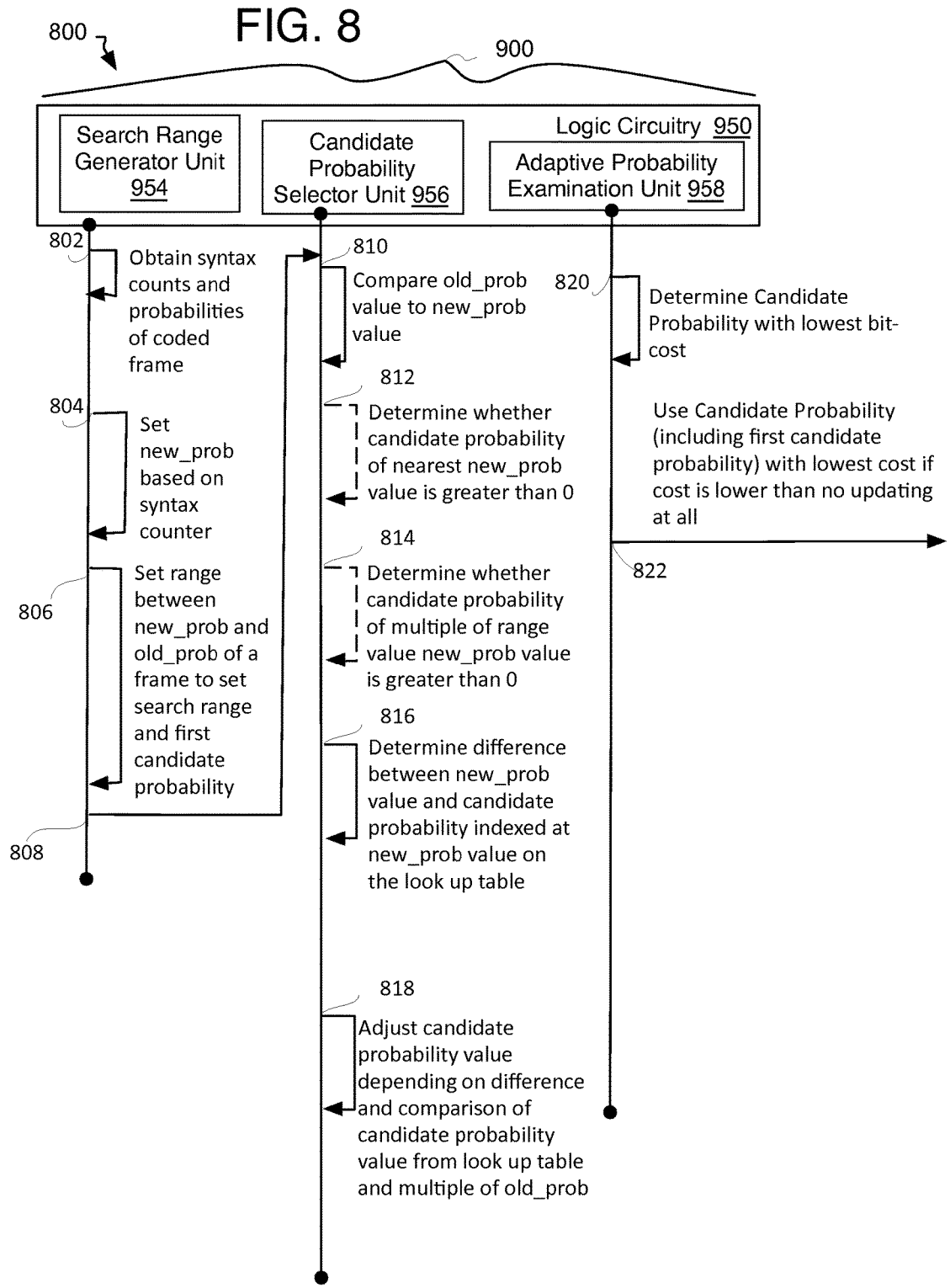

METHOD AND SYSTEM OF ENTROPY CODING USING LOOK-UP TABLE BASED PROBABILITY UPDATING FOR VIDEO CODING

BACKGROUND

Due to ever increasing video resolutions, and rising expectations for high quality video images, a high demand exists for efficient image data compression of video while performance is limited for coding with existing video coding standards such as H.264, H.265/HEVC (High Efficiency Video Coding) standard, and VP8/VP9. The aforementioned standards use expanded forms of traditional approaches to address the insufficient compression/quality problem, but the results are still insufficient.

Each of these typical video coding systems uses an encoder that generates data regarding video frames that can be efficiently transmitted in a bitstream to a decoder and then used to reconstruct the video frames. This data may include the image luminance and color pixel values as well as intra and inter prediction data, filtering data, residuals, and so forth that provide lossy compression so that the luminance and color data of each and every pixel in all of the frames need not be placed in the bitstream. Once all of these lossy compression values are established, one or more entropy coding methods, which is lossless compression, then may be applied. The entropy coding procedures are important to significantly reduce the number of bits that represents each string of symbols, or each syntax or symbol (each number or letter for example), in the bitstream and for reconstruction at the decoder.

Adaptive entropy coding systems use a listing of probabilities that each symbol is present in a given sequence to be coded on each frame. These probabilities are updated each frame or other interval in some systems, and the listing can become quite large with thousands of probabilities for thousands of possible symbols. A more efficient way to update the probabilities is desired.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 4 is a flow chart of an entropy coding method with look-up-table based probability updating for video coding;

FIGS. 5A-D is a detailed flow chart of an entropy coding probability updating process using a look-up table;

FIGS. 7A-7B is an example look-up table for an entropy coding probability updating process using a look-up table;

FIG. 8 is an illustrative diagram of an example system in operation for providing an entropy coding probability updating process using a look-up table;

DETAILED DESCRIPTION

Figure 1:
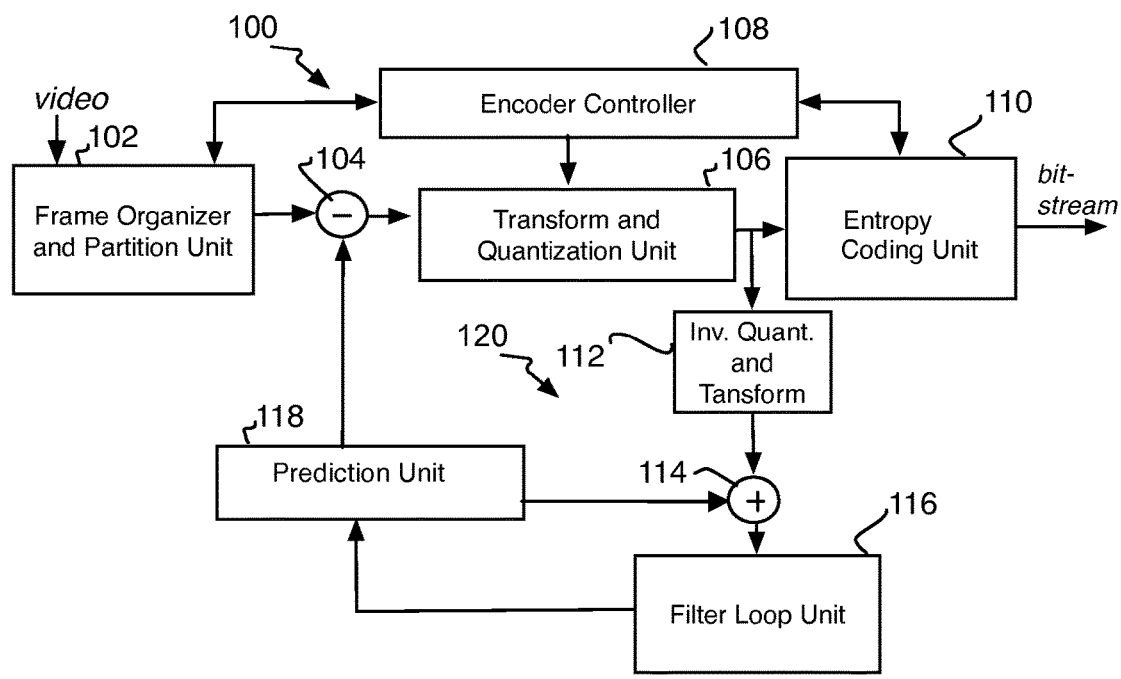
FIG. 1 is an illustrative diagram of an encoder for a video coding system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to entropy coding with look-up-table based probability updating for video coding.

As mentioned above, one way to improve video coding is by increasing the efficiency or speed of the entropy coding. For video coding standard VP9, the entropy coding uses an 8-bit arithmetic bool-coder as a coding engine such that each bool (each one or zero) is encoded one at a time. Generally, given a symbol from any n-ary alphabet, a static binary tree is constructed with n−1 internal nodes, and a binary arithmetic encoder runs at each such node as the tree is traversed to encode a particular symbol. To traverse the tree, a probability representing the occurrence frequency of zero at each node in the binary tree is used to encode each bit of a binarized symbol in the sequence. The probabilities use an 8-bit precision.

The probability model is fixed for the whole frame such that the probabilities do not change for a frame while a frame is being coded. All probabilities are known before the performance of both the entropy encoding and decoding of the frames. By one count, there are 1625 probabilities for each frame including 1582 transform and quantization coefficient probabilities, 3 skip probabilities, 12 transform size probabilities, and 28 inter mode probabilities. Each probability has a known base or default value, and is updated each frame (when the probability has changed). In backward adaption or updating, the probability from the previous frame is used to compute a modified state for the probability for a current frame before the entropy encoding of the current frame. All symbols encoded in the frame are then coded using the modified coding state. At the end of the frame, both the encoder and decoder are expected to have accumulated counts for various symbols actually encoded or decoded over the frame.

Using these actual distributions or counts, a forward update or adaption is applied to update the probabilities of the current frame thereby adapting the entropy coding context of the current frame for use as the baseline for the next frame. For conventional VP9 coding, a search is performed for each of the 1625 probabilities to determine their new optimal values. In other words, the probability values of the current frame are updated due to the use and coding of the symbols in the current frame. The search space is the range of possible probability values 0 to 255, and the search typically analyzes 100 to 150 possible probability values for each of the 1625 probabilities. This conventional system uses a brute force methodology to find the optimal value for all of the probabilities by exploring all possible values in the range from the base probability value to the probability value computed directly from the counters of current frame. This may generate a relatively large computational cost thereby decreasing the encoding performance or increasing power consumption.

To resolve these issues, the presently disclosed entropy coding methods significantly reduce the search space, such as to three search points per probability instead of 100-150 search points on average. This increases the speed of the probability update component of entropy coding, which increases the overall performance of the coding. This is accomplished by performing a syntax-counter-based search that uses left and right counts (the 0s or 1s) for arithmetic binary tree based coding for a symbol. The syntax count as well as a base probability from the given frame context is used to limit the size of the probability search range and to form a first probability candidate. Then, the correct probability candidates are chosen based on a look-up table, which has much smaller number of candidate probabilities than in the conventional system. The look-up table is generated by exploring the structure of a delta probability (between the optimal probability and base probability) defined in the conventional VP9 specification. The look-up table includes (1) probability candidates that each have a different probability update cost, and (2) probability candidates that are the closest probability to the first probability candidate given the same probability update cost. By one approach, there are merely three candidates for each of the probabilities being tracked, and not all three probabilities may even need to be checked to find the final probability for use as explained below.

Figure 2:
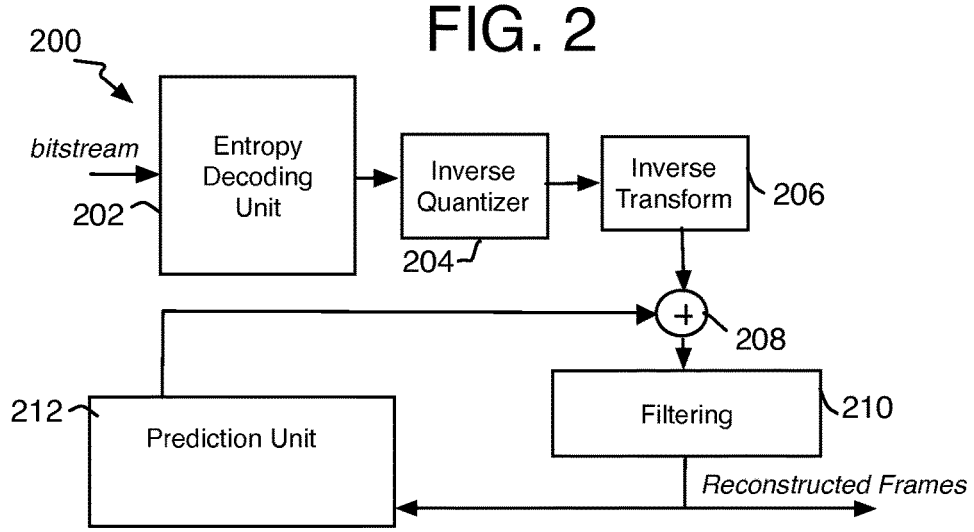
FIG. 2 is an illustrative diagram of a decoder for a video coding system.

Referring to FIGS. 1-2, to place the method and system of entropy coding herein in context, an example, simplified video coding system 100 is arranged with at least some implementations of the present disclosure to perform the look-up table based probability updating. In various implementations, video coding system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, VP9 or other VP#-based standards, but could also be applied to H.264 (MPEG-4), H.265 (High Efficiency Video Coding or HEVC), and other standards where relevant or where modified to be compatible with VP based entropy coding. Although system 100 and/or other systems, schemes, or processes may be described herein, the features of the present disclosure are not necessarily all always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

In some examples, video coding system 100 may include additional items that have not been shown in FIG. 1 for the sake of clarity. For example, video coding system 100 may include a processor, a radio frequency-type (RF) transceiver, splitter and/or multiplexor, a display, and/or an antenna. Further, video coding system 100 may include additional items such as a speaker, a microphone, an accelerometer, memory, a router, network interface logic, and so forth.

For the example video coding system 100, the system may be an encoder where current video information in the form of data related to a sequence of video frames may be received for compression. The system 100 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 100 may include a frame organizer and partition unit 102, a subtraction unit 104, a transform and quantization unit 106, an entropy coding unit 110 that performs many of the operations described herein, and an encoder controller 108 communicating with and/or managing the different units. The controller 108 manages many aspects of encoding including rate distortion, selection or coding of partition sizes, prediction reference types, selection of prediction and other modes, and managing overall bitrate, as well as others.

The output of the transform and quantization unit 110 also may be provided to a decoding loop 120 provided at the encoder to generate the same reference or reconstructed blocks, frames, or other frame partitions as would be generated at the decoder. Thus, the decoding loop 120 uses inverse quantization and transform unit 112 to reconstruct the frames, and adder 114 along with other assembler units not shown to reconstruct the blocks within each frame. The decoding loop 120 then provides a filter loop unit 116 to increase the quality of the reconstructed images to better match the corresponding original frame. This may include a deblocking filter, a sample adaptive offset (SAO) filter, and a quality restoration (QR) filter. The decoding loop 120 also may have a prediction unit 118 with a decoded picture buffer to hold reference frame, and a motion estimation and compensation unit that uses motion vectors for inter-prediction, and intra-frame prediction module. The prediction unit 118 may provide a best prediction block both to the subtraction unit 104 to generate a residual, and in the decoding loop to the adder 114 to add the prediction to the residual from the inverse transform to reconstruct a frame. Other modules or units may be provided for the encoding but are not described here for clarity.

More specifically, the video data in the form of frames of pixel data may be provided to the frame organizer and partition unit 102. This unit holds frames in an input video sequence order, and the frames may be retrieved in the order in which they need to be coded. Frames may be assigned classification such as I-frame (intra-coded), P-frame (inter-coded, predicted from a previous reference frames), and compound-frame which is based on averages from two vectors. When a VP9 standard is used, a frame may be divided into 64×64 superblocks which can be subdivided in a number of different ways, such as 32×32, 32×16, 16×16, 8×16, and down to 8×8, 4×8, and 4×4 partitions for example, and recursive quadtree subdivisions that can be only horizontal or only vertical. Large tiles, such as 256×4096 may be used to define the division of coding dependencies. It will be understood that the entropy coding method used herein may be used for the coding based on other frame partitions for VP9 or other standards, including LCU, CU, PU, and other tree block arrangements used for HEVC for example, or macroblocks or divisions thereof for MPEG, H.264/AVC and so forth. A frame may also be divided into different sizes (32×32, 16×16, 8×8 and 4×4) for transform and quantization.

The current blocks may be subtracted from predicted blocks from the prediction unit 118, and the resulting difference or residual is partitioned as stated above and provided to a transform and quantization unit 106. The relevant block or unit is transformed into coefficients using discrete cosine transform (DCT) and/or discrete sine transform (DST) to name a few examples. The quantization then uses lossy resampling or quantization on the coefficients. The generated set of quantized transform coefficients may be reordered and then are ready for entropy coding.

The output of the transform and quantization unit 106 also may be provided to inverse quantization and transform unit 112 in the decoding loop 120 so that the residuals can be reconstructed and added to the prediction blocks from the prediction unit 118 to generate a rough reconstructed block, which may be reassembled unto larger block units. The quality of the reconstructed frame is then improved by running the frame through the filters 116. The filtered frames are then provided to the prediction unit 106 which performs inter-prediction that determines motion vectors for the motion of blocks form reference frames to a current, and performs intra-prediction or spatial prediction on a single frame. The result is the motion vectors and predicted blocks.

The entropy coding unit 110 generates a portion of a compressed bitstream. As described in detail below, the VP9 entropy encoding is much the same as that of VP8 except for certain modifications such as interleaving all data types rather than using data partitioning. For VP9, the entropy coding may be performed in three sections for each frame including a relatively small uncompressed header that may hold picture size, loop filter strength, and so forth. A second compressed header section may be used as a bool-coded section that transmits the probabilities used for the whole frame. By one example, the probabilities may be transmitted as deviations from their default values. A third section is the compressed frame data which includes the bool-coded data with the data used to reconstruct the frame. The entropy coding system here may use binary-based arithmetic coding (where only 0 and 1 form the alphabet), and uses fixed probability updating (where the probabilities are not changed during the coding of a frame) with both forward adaption and backward adaption for updating of probabilities for the symbols. The entropy coding unit 110 is capable of performing the highly efficient look-up table based, backward updating or adaption described in detail below. In various implementations, a bitstream provided by video coding system 100 may include entropy-encoded coefficients in addition to side information used to decode each block (e.g., prediction modes, quantization parameters, motion vector information, partition information, in-loop filtering information, entropy coding probabilities, and so forth), and may be provided to other systems and/or devices as described herein for transmission or storage.

Referring to FIG. 2, an example, simplified system 200 may have, or may be, a decoder, and may receive coded video data in the form of bitstream. The system 200 may process the bitstream with an entropy decoding unit 202 to extract quantized residual coefficients as well as the motion vectors, prediction modes, partitions, quantization parameters, filter information, entropy coding probabilities, and so forth. Relevant here, the entropy decoding unit 202 receives the entropy coding probabilities as the default values and the residual or deviations in order to rebuild the probabilities for each frame, and including the updated probability values for each frame. When the decoding unit receives the known probabilities as well as the code of the symbols, the entropy decoding unit 202 can reverse the bool-coded, binary tree arithmetic coding operation and reconstruct the coded symbols.

The system 200 may then use an inverse quantization module 204 and inverse transform module 206 to reconstruct the residual pixel data. Thereafter, the system 200 may use an adder 208 to add assembled residuals to predicted blocks to permit rebuilding of prediction blocks. These blocks may be passed to the prediction unit 212 for intra-prediction, or first may be passed to a filtering unit 210 to increase the quality of the blocks and in turn the frames, before the blocks are passed to the prediction unit 212 for inter-prediction (including motion estimation and compensation) depending on the coding mode indicated in syntax of the bitstream and implemented via a prediction mode switch or selector. The prediction unit 212 may set the correct mode for each block before the blocks are provided to the adder 208. The functionality of the units described herein for systems 100 and 200, except for the entropy coding unit 110 described in detail below, are well recognized in the art and will not be described in any greater detail herein.

Figure 3:
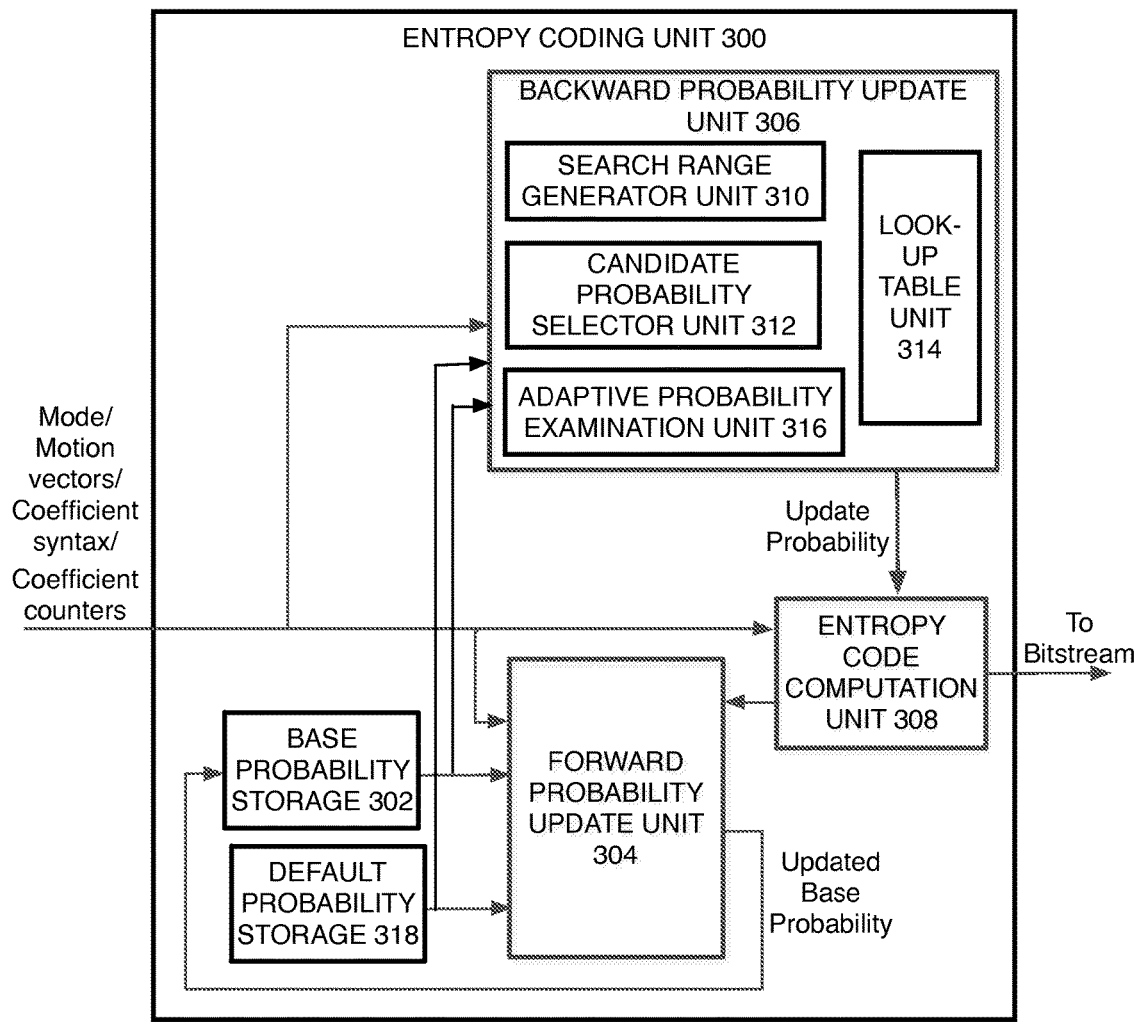
FIG. 3 is an illustrative diagram of an entropy coding unit.

Referring to FIG. 3, an entropy coding unit 300, which may be the same or similar to entropy coding unit 110, may have a base probability storage 302, a forward probability update unit 304, a backward probability update unit 306, and an entropy code computation unit 308, and a default probability storage 318. Image data that is ready to be entropy encoded is received by the entropy coding unit 300 and may include data to reconstruct frames such as prediction mode, motion vectors, coefficient syntax data, and transform and quantization coefficient counters, and so forth. The image data is provided to the forward probability update unit 304, the backward probability update unit 306, and the entropy code computing unit 308. The backward probability unit 306 obtains base probabilities used on the previous frame from the base probability storage 302, or when not available from the default probability storage 318, and calculates updates for at least some of the syntax provided in the image data. The computed modified updated probabilities are then provided to the entropy code computation unit 308 that uses the modified probabilities to perform entropy algorithms such as arithmetic coding type algorithms to code the syntax, and in one form, using binary trees. Such a process is specified by conventional VP9 operation. The computed codes are then provided to other units for placement in a bitstream for transmission to decoders or storage. Also, the probabilities and the binary counts from the binary tree structures are provided to the forward probability update unit 304.

The backward probability update unit 306 is provided to search for an optimal probability for each of the provided probability classes (or provided probabilities) such as the 1625 probabilities for each frame (although other counts may exist depending on which frame reconstruction data and which standards are being used, and so forth, many different factors may apply. Here, optimal refers to minimizing the number of bits for indicating an update action and to perform the updating of the probability. Other goals may apply such as lowering bitrate, power consumption, computational load, and so forth. Here, the optimization of bit-size for transmitting probability updates may negligibly increase computational load.

The backward probability update unit 306 may have a search range generator unit that sets limits for a search of candidate probabilities by considering the previous probability used and a new probability that is based on the syntax counters as explained below. A candidate probability selector unit 312 then may use these range setting values in algorithms to select candidate probabilities from a look up table stored and managed by a look up table unit 314. The candidate probabilities are selected from the look-up table with the index computed from the base probability and the probability computed, by one example form, purely from the counters. The number of candidate probabilities may vary depending on the base probability and the probabilities from the counters. Once candidate probabilities are selected, an adaptive probability examination unit 316 may select a best candidate probability among the selected candidates and depending on the bit-size of performing and indicating the updating. It will be understood there may be other considerations in the bit-size calculation. Once the best probability is selected, the best probability will be fed into the entropy coding computation unit 308 to encode the current frame. It will be understood, however, that backward probability update unit 306 may not be used for each frame in a video sequence and may be performed adaptively for only selected frames, such as frames at certain intervals (such as every 20 or 100 frames) or frame of certain types such as only I-frames (intra-coded), or by comparing the updating cost values against a threshold where, by one example, the cost is greater than or equal the threshold, the update is performed; otherwise, it is not. Other examples exist.

For one example implementation, an efficient entropy process using look-up table based probability updating is described as follows.

Referring to FIG. 4, a flow chart illustrates an example process 400, arranged in accordance with at least some implementations of the present disclosure. In general, process 400 may provide a computer-implemented method of entropy coding using look up table based probability updating for video coding as mentioned above. In the illustrated implementation, process 400 may include one or more operations, functions or actions as illustrated by one or more of operations 402 to 412 numbered evenly. By way of non-limiting example, process 400 will be described herein with reference to operations discussed with respect to FIGS. 1-3 and 8 may be discussed with regard to example systems 100, 200, 300, or 800 discussed below.

The process 400 may comprise "receive image data comprising a syntax having a sequence of symbols to be entropy coded" 402, and as mentioned, the image data may be whatever data may be needed to reconstruct video frames and is ready to be entropy coded.

The process 400 also may include "update a previous probability that a symbol will occur in one of the sequences" 404. As mentioned above, VP9 has 1625 probabilities on each frame although other counts may exist, and a search for the optimal probability for each of those probabilities may be performed. By one example, this is performed for backward probability updating so that the updated probabilities can be used to encode the current frame efficiently.

The process 400 also may include "set a search range among a set of possible update probability values" 406. As described in detail below, this may include setting the ends of the search range at a value related to a previous probability (used from the previous frame and referred to as the old probability) on one end and a value related to a new probability that is based on the syntax counter (count of left and right (0 and 1) from the binary tree) for a single bit.

The process 400 also may include "set a first candidate probability for updating the previous probability" 408, and this may include using the new probability related value as the first candidate probability.

The process 400 also may include "search for at least one more candidate probability in a set of candidate probabilities on a look-up table" 410. In one form, up to three more candidate probabilities may be considered in addition to the first candidate probability. In this example, the established range as well as the new and old probability values are considered index numbers for the look up table, and each index number (or range probability value) has one or more candidate probability values associated with it and listed in the look up table. By one example, the look up table at least includes, and by one form only includes, those candidate probability values that all have a different probability update costs, and are closest to the first candidate probability computed from the symbol (or syntax) counters. The candidate probabilities are themselves calculated by using symbol counters as explained below. A number of algorithms explained in detail below are used to determine which candidate probabilities from the look up table should be considered.

The process 400 also may include "select one of the candidate probability values to update the previous probability for coding of the symbol, and selecting based on, at least in part, the bit-cost associated with updating the previous probability with at least one of the candidate probabilities" 412. As explained below, this may include both the probability bit-cost for providing the data for indicating an update is to be performed as well as the data needed to actually perform the update. For one example, the candidate probability, among the few selected candidates from the look-up table, with the lowest bit-cost is selected as long as it lower than the bit-cost of omitting the update and doing nothing for the particular probability being considered.

Referring now to FIG. 5A-5D, a detailed example entropy coding process 500 is arranged in accordance with at least some implementations of the present disclosure. In general, process 500 may provide another computer-implemented method of probability updating for entropy coding as part of video coding. In the illustrated implementation, process 500 may include one or more operations, functions or actions as illustrated by one or more of operations 502 to 546 numbered evenly. By way of non-limiting example, process 500 will be described herein with reference to operations discussed with respect to FIGS. 1-3 and 8, and may be discussed with reference to example systems 100, 200, 300, and/or 800 discussed below.

As mentioned above backward probability updating or adaption may be carried out for each probability (of the 1625 or other number of probabilities) computed per frame. Otherwise, the backward updating may be carried out only for selected frames either by frame interval, type of frame, adaptive algorithms, or any other prerequisite as desired.

One of the first operations is to compute the probability search range and the first probability candidate. Thus, process 500 may include setting P_old as the base probability. The base probability (as the input to this algorithm) is obtained from the given frame context such that the base probability is the actual probability used and coded in a previous (or just previous) frame.

Figure 6:
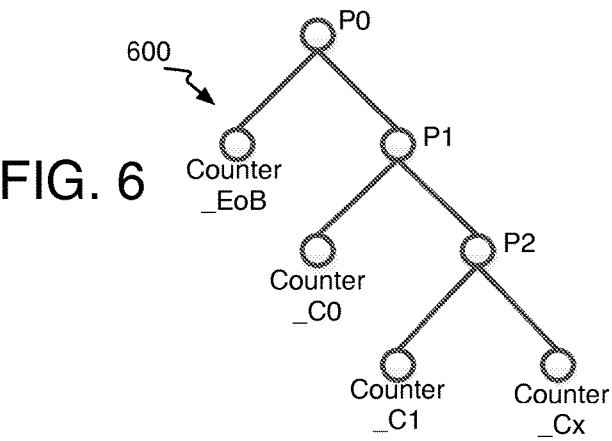
FIG. 6 is a schematic diagram of an example entropy coding tree.
Figure 5A:
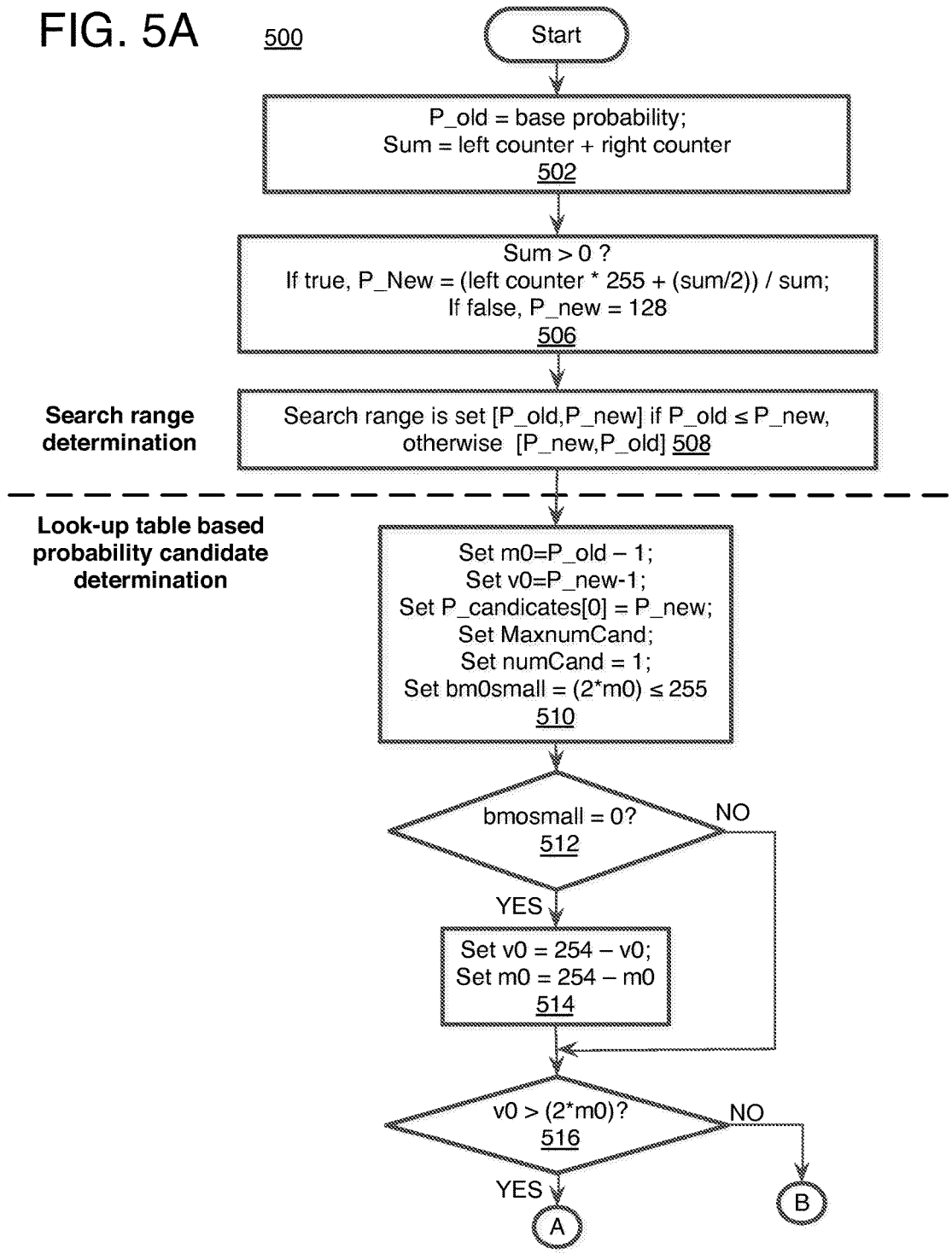

Referring to FIG. 6, the process 500 also includes setting "Sum=left counter+right counter" 502. The syntax counter (as the input to this algorithm) is collected by accumulating the syntax. More specifically, arithmetic coding is performed using a binary tree such as example tree 600. Each symbol of the syntax is one of the leaves, and a probability for each bit that is to be placed in the code is placed on a node of the tree. Thus, say a symbol C1 from the set of {EoB, C0, C1, Cx} is being coded. By traversing the binary tree from the root, the symbol C1 can be represented by a binary string of 110 (assuming right edge in the tree represents 1). In the tree, each node is associated with a probability which is used to code 0 or 1. In this example, P0 is used to code the first binary 1, P1 is used to code the second binary 1 and P2 is used to code the third binary number 0. The probability P0, P1 or P2, may be a probability of 0.5, and is actually placed in a fraction P/256 so that P for the discussions herein is treated as P=128 (0.5=128/256). One way to compute the probability of each node can be as follows: counter of the left branch is divided by the sum of the counters of the left branch and the right branch. For example:

$P2=Counter\_C1/(Counter\_C1+CounterCx)$, $P1=Counter\_C0/(Counter\_C0+Counter\_C1+CounterCx)$, and $P0=Counter\_EoB/(Counter\_EoB+Counter\_C0+Counter\_C1+CounterCx)$.

Process 500 may include setting "Sum>0? If true, P_new=left counter*255+(sum/2))/sum; If false, P_New=128" 506. Here, the initial P_new is set as the counter of the left branch divided by the sum of the counters of left branch and right branch. P_new, as explained below, is the first candidate probability. It is based on the syntax without consideration of the costs for performing the update at this point.

Process 500 may include setting 508 the search range from P_old to P_new, where the smaller probability is set as the lower end of the range (or the first value of the range), and the higher probability is set as the higher end of the range.

The next operations relate to selecting correct (or accurate) probability candidates based on a look-up table. To initialize the process, process 500 may perform the setting 510 of a number of variables. This includes setting a previous probability based value m0=P_old−1 in order to check a probability that is close, or closest to the previous base probability. Likewise, a new probability based value v0=P_new−1 to check the probability near or close to the new probability P_new). Also, P_candidate[0] is set to P_new, or in other words as the first candidate probability. As explained above, this value is based on the syntax while ignoring costs. A maximum number of candidate probabilities (MaxnumCand) is set, and by one example, set at 3 or 4. MaxnumCand may be set to one more than the number of candidates to be analyzed for purposes of the flow chart as explained below. NumCand (the number of the current candidate probability) may be set at 1 to start the analysis of candidates. Also, bm0small may be set at a multiple of m0 (here 2×m0) as a test of the lower limit of the range. It will be noted that while multiplication operation is discussed, actual code may be set as a bitshift (m0<<1). The resulting value is set at or less than 255. It will be understood that for anywhere in process 500 where a multiple or division is used, a bitshift may be used instead but is shown as multiplication or division for clarity.

Process 500 then checks 512 to determine whether P_old=1 by asking if bm0small=0? Thus, if P_old=1, then m0=0. If m0=0, then the values of m0 and v0 are changed with regard to the possible 255 probability values. For example, v0=254−v0, and m0=254−m0 as operation 514.

Next a determination is made as to how wide the range is between v0 and m0 (and in turn P_New and P_old values), and whether the range rises in value from old to new, or lowers in value from old to new. The candidate probabilities will be determined differently depending on the size and direction of the range. Therefore, a check is made as whether v0 is greater than twice the size of m0, "v0>(2*m0)" 516, and again the multiplication may be replaced with a bitshift. If not, another check may be performed to determine if v0 is greater than m0 at all (operation 530).

Figure 7B:
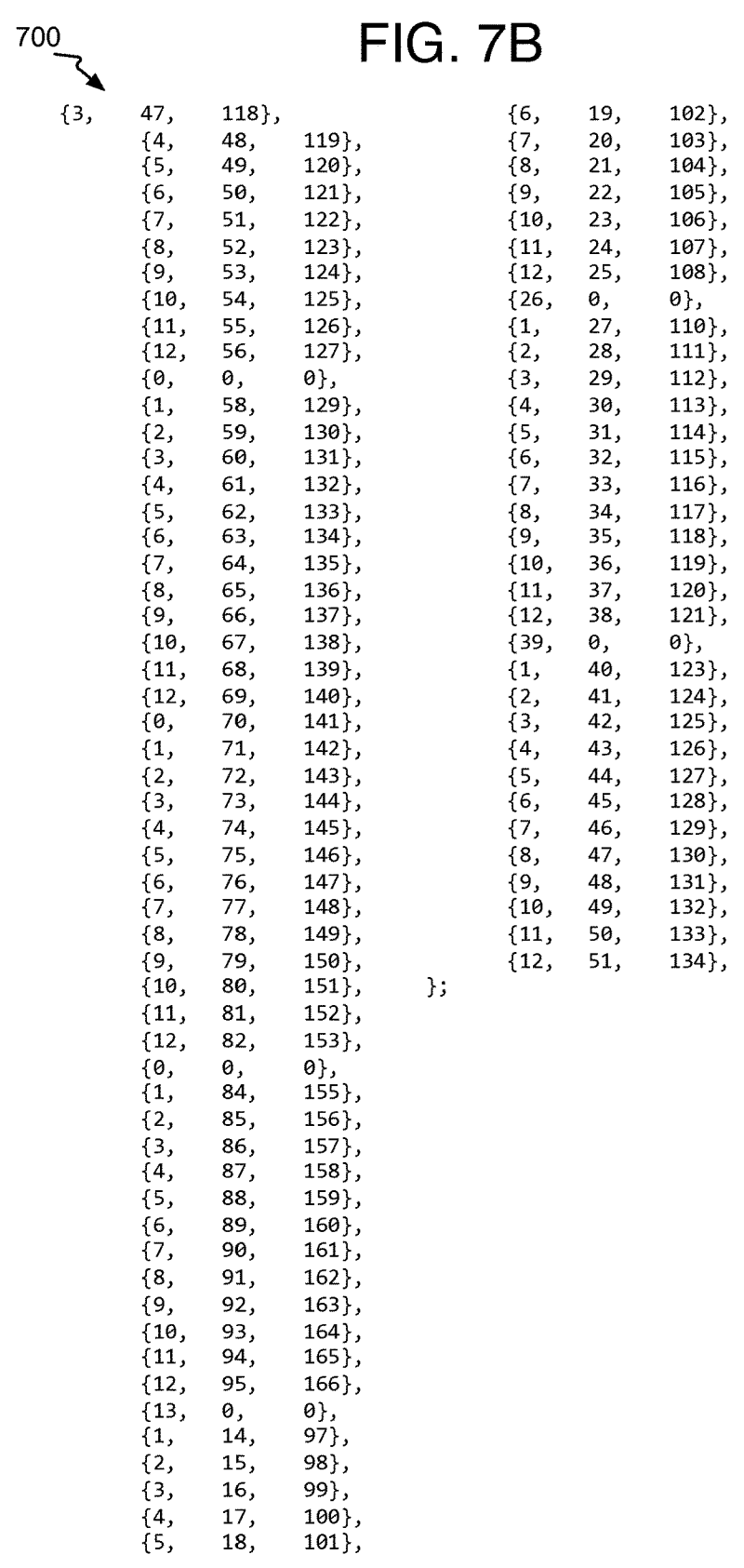

Referring to FIGS. 7A-7B, before explaining the operation of selecting candidates further, the look-up table must be described. An illustrated example look-up table 700 is provided with three columns within the table and split into five sections for display and in order from left to right and page to page where the table continues from the bottom of one section to the top of the next section. Also, each row in the look-up table corresponds to an index probability value 1 to 254 and is number from 1 to 254 going down the columns and starting with the left section of FIG. 7A and ending with the right section of FIG. 7B, although the number of the row is not shown. These index probability values correspond to the probability values of P_old and P_new (and therefore v0 and m0) to set the search range on the look-up table. Each row may have one or more candidate probability values (here, three are provided) so that three candidate probability values may be tested for each index probability value. Stated another way then, the look-up table has a size of 254*3 entries. Since the table size is 254*3 entries, for each probability, only 3 candidates are selected for the next step candidate examination.

By one example, the candidate probability values are calculated by searching (or establishing) all the probabilities in the range of an initial P_old and P_new, such as for a first frame in a sequence of frames, and only selecting the first predetermined number of, here the first three, probabilities that have a different update cost and are closest (in value) to the probability P_new to be associated with each probability on the established range (called the update probability or the index probability). Thus, the look-up table reflects the structure of delta probability (between the optimal probability and base probability) defined as in the VP9 specification. Particularly, the P_old and P_new are used to generate the first index of the look-up table. However, the look-up table itself is generated ahead of time for all the other subsequent possible P_old and P_new for each of the probabilities (the 1625 probabilities for example) for a frame. The initial P_old and P_new combination can only generate an index from 0-253 (total 254 rows in the look-up table). Given the first index of the look-up table, one row of three probabilities are formed that serve as the candidate probabilities for further examination.

Another way to state the above prerequisites is that the look-up table is constructed such that only the probabilities satisfying the below two conditions are included. Condition 1: the probability candidates have different probability update costs of replacing the base probability with the selected probability. Thus, no probability candidate on the look-up table has the same cost as any other candidate probability on the look-up table in the same row. Hence, the optimal probabilities are in the look-up table, and the probabilities considered sub-optimal are not in the table. By one form then, only the probabilities in this look-up table need to be examined instead of all possible probabilities.

For condition 2: the candidate probabilities that are listed on the look-up table are the closest probability to the first probability candidate P_new (which is the optimal probability ignoring the probability update cost), given the same probability update cost.

Continuing now with process 500, when v0 is greater than double m0, the process 500 may include a check 518 as to whether "numCand<MaxnumCand" and "ProbLut[v0-1][numCand]>0". The first phrase simply is a count of candidate probabilities. In the second phrase ProbLut[v0-1][numCand] is the value of a candidate probability on the look-up table. The second phrase is a check to see if the candidate probability is greater than 0. When the table has a '0' entry, a search is not needed for this probability (index) value. For example ProbLut[128][1] would be the row of index probability value 128 and the first candidate probability entry on that row—where in the present example candidate probabilities [1] to [3] will be examined for a row index probability value. If either of the two phrases is not true, then the maximum number of candidate probabilities have been selected (or the candidate probability value is 0), and the process continues to examination of the candidate probabilities.

If both are true, then process 500 continues with "Set Tmp=v0-1-ProbLut[v0-1][numCand]" 520. Tmp is an intermediate value that is the difference between a new probability based value (here v0-1) and the candidate probability determined by using the new probability based value as the index value to look up the candidate probability on the look-up table. This is performed to match the mapping of the candidate probability values in VP9 specifications. Thus, other thresholds or values could be used as tmp.

Process 500 then may include checking whether tmp is greater than a multiple of m0, and here, "tmp>(2*m0)?" 522. If this is true, although not shown, tmp could be tested to make sure it is an even number if necessary, before using calculations to adjust candidate probabilities. This is the same with operation 528, and is expressly provided for operations 536 and 548 discussed below.

Then, the candidate probability is set based on tmp and whether the candidate probability value is equal to double m0 (double the near P_old value)). Specifically, whether "P_candidate[numCand]=bm0small?" 524. If this is true, then P_candidate[numCand] is revised to tmp +2. If this false, then P_candidate[numCand] is revised to 254–tmp. Thereafter, process 500 includes "set numCand=numCand+1" 526 to analyze the next candidate probability on the same row of ProbLut[v0-1].

If tmp is equal to, or less than, (2*mo), the same test 528 is performed for P_candidate[numCand]=bm0small? If true, P_candidate[numCand] is revised to (tmp+1)/2+m0+1. If it is false, P_candidate[numCand] is revised to 255–((tmp+1)/2+m0. The candidate probability number is then incremented up 1 (526) as mentioned before. These operations repeat until, as mentioned above, the maximum number of candidate probabilities is reached (or the candidate probability has a value of 0 and search for that probability (index value) is not needed), and the candidate probabilities are examined as described further below.

Returning to operation 530, when v0 is not greater than double m0, a check is made to determine whether it is still true that "v0>m0" 530. If true, the process 500 continues with an operation having the test of the same two phases for the candidate probability count and the value of the candidate probability being greater than zero. Here, however, instead of looking up the look-up table row related to the P_old value (v0–1), now the selection of the row is based on values relating to the entire range, such that "ProbLut[v0-m0][numCand]>0" 532 is checked as the second phrase in the test, as when v0 is much larger than m0, where a zero is found in the table, the search is not needed for that probability index value.

As with operation 518, if either phrase here is not true, then the process proceeds to candidate probability examination. When both phrases are true, process 500 includes "set tmp=(2*(v0−m0))−1−ProbLut[(2*(v0−m0))−1][numCand]" 534. As with operation 520, a difference value tmp is based on the index probability value (e.g., (2*(v0−m0))−1) and the candidate probability determined by using the index probability value to determine the row to obtain the candidate probability value. As with operation 530, the basis of the values is about the whole range (v0−m0) rather than near the P_new value (v0−1).

Process 500 may continue by testing whether tmp is an even number for candidate probability setting calculations (536). If so, the process continues to operation 540. If not, the candidate probability is not adjusted and the next candidate probability is obtained for selection.

Process 500 then continues with adjusting the P_candidate[numCand] values at operation 540 the same or similar as operation 528 (for when v0 is greater than double m0 but tmp is not greater than double m0). Process 500 then increments the candidate probability counter numCand up by 1 (542) and the process loops until the maximum number of candidate probabilities are selected (or a candidate probability equals 0) as explained above.

Similarly now, when v0 is less than m0 (the range is reversed where the new value is lower than the old value), then process 500 continues with a similar operation 544 as operation 532 except here, the candidate probability ProbLut [(2*(v0−m0))−2][numCand] has the range (doubled) subtracted by two instead of one.

Process 500 then may include setting the difference value "tmp=(2*(v0−m0))−1−ProbLut[(2*(v0−m0))−1][numCand]" 546 similar to that of operation 534 again except two is subtracted rather than just one from the index probability value to find the row for the candidate probability in the look-up table. The tmp value is then checked 548 as before to make sure it is an even value, and then the candidate probability value may be modified 550 the same as operation 540, again here, except that two is added to tmp instead of one in the algorithm to adjust the candidate probability value. The candidate probability number numCand is incremented up 552, and the process proceeds as explained before to loop until the maximum number of candidate values are set.

Once the candidate values are selected and set, by one example, an examination is performed by computing the cost of updating probability and the cost of indicating an update, and then the costs also may be compared with the cost of no update. The best candidate is selected with the smallest cost. To further reduce the number of candidates to be examined, an early exit operation may be performed on this examination if the cost of the second probability candidate is larger than or equal to the cost of the first probability candidate. In that case, the examination is stopped, and the first probability candidate is selected as the best probability. There are many different processes and order of operations that could be used for comparing updating costs, and process 500 merely provides one possible process.

More specifically, process 500 may include "set idx =0" 554 for the examination and as an index number to count the candidate probabilities. A test is then performed "idx<numCand" 556. NumCand is currently set at the maximum value from operation 518, 532, or 544 When this phrase is true, examination continues with "compute updating cost C[idx] for probability P_candidate [idx]" 558. This include calculating the cost for P_candidate [0] which is the first probability candidate based on the syntax count and omitting the cost consideration. The idx is then tested 560 if it is zero (the first candidate probability). If so, the process increments (566) the idx counter up one and obtains the candidate probability P_candidate[1].

Now, after determining the cost C[1], the process proceeds to "Set P_candidate[idx] for updating if the probability P_candidate[idx] has a lower cost C[idx] then cost C[idx−1]" 562. Thus, each candidate probability is tested against the candidate probability before to determine which has the lower cost. The result will eventually be that the candidate probability with the lowest cost of all of the candidate probabilities being checked will be set as the candidate probability for updating.

Optionally, the early exit operations may include a test to determine "updating cost is greater than the updating cost C[0] of probability P_candidate[0]" 564. If true, then P_candidate[0], or in other words, the first candidate probability P_New based on syntax counters without cost consideration is to be used as the probability. If false (P_candidate[0] has the greater updating cost), then the process determines if there are more candidate probabilities to check by incrementing to idx number up one (566) and looping to operation 556. The finally selected or modified probabilities are provided to the entropy code computation unit for example to perform the coding for the current frame. The probabilities and counts are then provided to the forward updating unit that may then use the modified probabilities to update (568) the base probability database for use to update the probabilities of the next frame as explained above.

Given the above algorithm, only up to 3 probability candidates are selected and on average, around 2 candidates, on average, are checked. Compared to more than the brute force methods which require 100-150 candidates to be searched per probability category (the 1625 probabilities per frame), the performance of this algorithm has been improved by more than 20×, while the encoding efficiency is only reduced by less than 0.5%, which is negligible.

As to decoding, the probabilities for each of the 1625 may be stored as four different frame contexts or profiles that each have a different subsampling scheme. The decoder maintains the frame contexts, and the bitstream signals which of the contexts to use as the frame contexts for decoding.

Referring now to FIG. 8, system 900 may be used for an example entropy coding process 800 having probability updating using a look-up table and shown in operation, and arranged in accordance with at least some implementations of the present disclosure. In the illustrated implementation, process 800 may include one or more operations, functions, or actions as illustrated by one or more of actions 802 to 822 numbered evenly, and used alternatively or in any combination. By way of non-limiting example, process 800 will be described herein with reference to operations discussed with respect to any of the implementations described herein.

Figure 9:
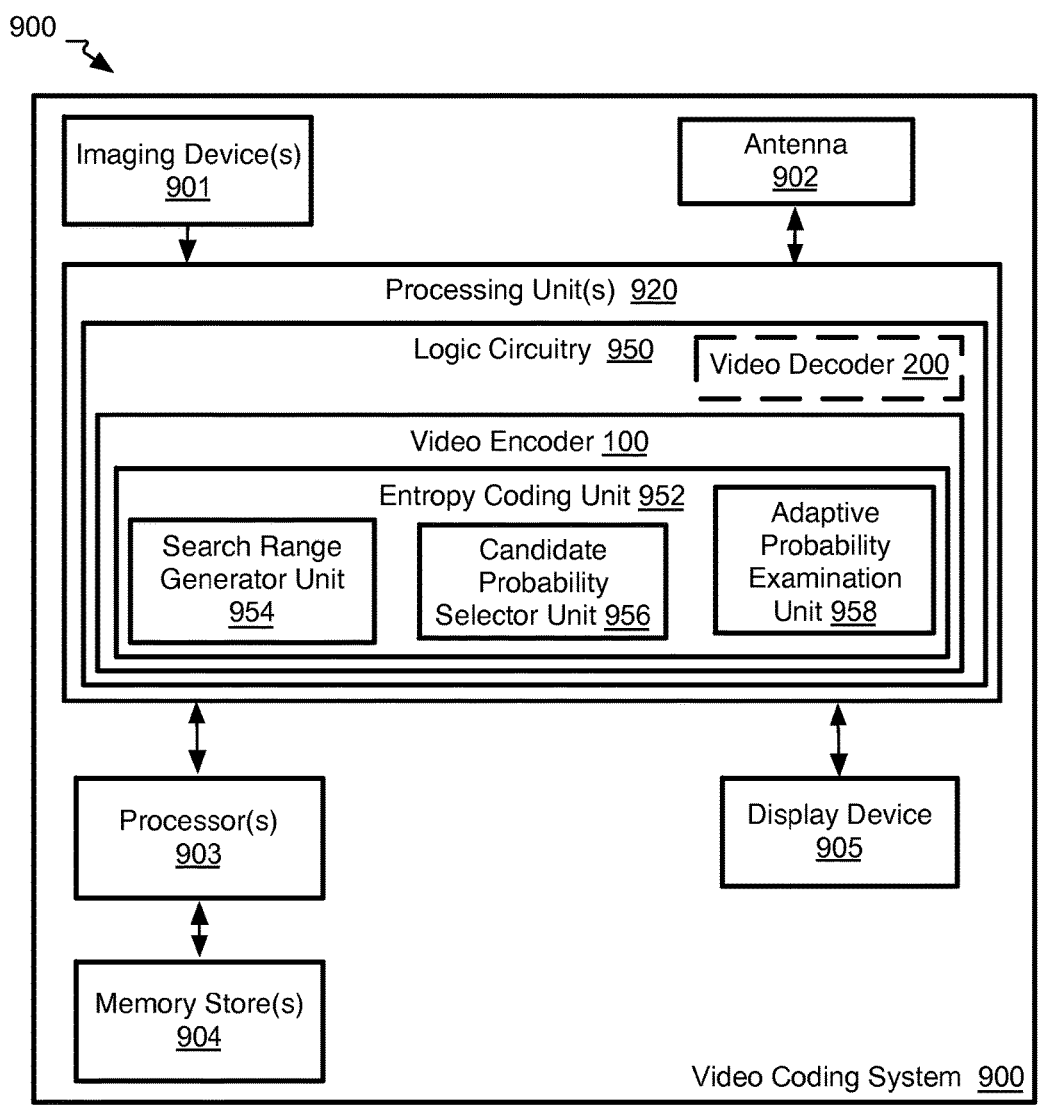
FIG. 9 is an illustrative diagram of an example system.

In the illustrated implementation, system 900 may include a processing unit 920 with logic units or logic circuitry or modules 950, the like, and/or combinations thereof. For one example, logic circuitry or modules 950 may include the video encoder 100 with an entropy coding unit 952 and optionally the video decoder 200. The entropy coding unit 952 may have a search range generator unit 954, a candidate probability selector unit 956, and an adaptive probability examination unit 958. Although system 900, as shown in FIG. 9, may include one particular set of operations or actions associated with particular modules or units, these operations or actions may be associated with different modules than the particular module or unit illustrated here.

Process 800 may include "obtain syntax counts and probabilities of coded frame" 802, and particularly, from the base probability storage having the probabilities from the previous frame that was coded by one example.

Process 800 may include "set new_prob based on syntax counter to set as first candidate probability" 804, and as explained above, the new probability may be set without consideration of any costs.

Process 800 may include "set range between new_prob and old_prob of a frame to set search range" 806, and where the old probability old_prob is the base probability actually coded on the previous frame (or coded frame where data is obtained).

The operation then may shift 808 to the candidate probability selector unit, and process 800 may include "compare old_prob value to new_prob value" 810, and where the value refers to v0 and m0 as defined above by one example. These values are compared to determine which algorithms to apply for selecting and adjusting candidate probability values. For example, whether v0 is greater than twice m0, simply greater than m0, or less than m0.

If v0 is much greater than m0, then process 800 may include "determine whether candidate probability of nearest new_prob value is greater than 0" 812. If 0, no further candidates are selected. This is in addition to providing up to a maximum number of candidate probabilities (such as three in the present example).

If v0 is not much greater, or less than, m0, then process 800 may include "determine whether candidate probability of multiple of range value new_prob value is greater than 0" 814. Again, if 0, then no more candidates are selected. This is in addition to providing up to a maximum number of candidate probabilities (three as mentioned above for one example).

Process 800 may include "determine difference between new_prob value and candidate probability indexed at new_prob value on the look up table" 816. This operation refers to finding tmp as defined above. This may be while setting the index probability for computing the difference and determining the row on the look up table based on v0−1 or v0−m0 (and whether adding one or two to double the range for v0−m0).

Process 800 may include "adjust candidate probability value depending on difference and comparison of candidate probability value from look up table and multiple of old_prob" 818. In other words, by one example, the difference is tmp which may be used in algorithms recited above and in process 500, and the comparison is comparing, by one example, the candidate probability to bm0small.

Once the candidate probabilities are selected and adjusted, process 800 then may turn 820 to the examination of the candidate probabilities for cost analysis. Thus, process 800 may include "determine candidate probability with lowest bit-cost" 820, and may include the processes described above.

Process 800 may include use candidate probability (including first candidate probability) with lowest cost if cost is lower than no updating" 822. Thus, the probability with the lowest cost is used to update the base probability database for future forward updating and use for coding. This includes the optional early exit steps that will set the first candidate probability as the final update probability if no other candidate has a lower cost.

While implementation of example process 400, 500, and/or 800 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 9, an example video coding system 900 for providing entropy coding with look-up table based probability updating may be arranged in accordance with at least some implementations of the present disclosure. In the illustrated implementation, system 900 may include imaging device(s) 901, antenna 902, one or more central processing units or processors 903, a display device 905, and one or more memory stores 904. Central processing units 903, memory store 904, and/or display device 905 may be capable of communication with one another, via, for example, a bus, wires, or other access. In various implementations, display device 905 may be integrated in system 900 or implemented separately from system 900.

As shown in FIG. 9, and discussed above, the processing unit 920 may have logic circuitry 950 with an encoder 100 and/or a decoder 200. The video encoder 100 may have an entropy coding unit 952 with a search range generator unit 954, a candidate probability selector unit 956, and an adaptive probability examination unit 958 to provide many of the functions described herein and as explained with the processes described herein.

As will be appreciated, the modules illustrated in FIG. 9 may include a variety of software and/or hardware modules and/or modules that may be implemented via software or hardware or combinations thereof. For example, the modules may be implemented as software via processing units 920 or the modules may be implemented via a dedicated hardware portion. Furthermore, the shown memory stores 904 may be shared memory for processing units 920, for example. Probability update data may be stored on any of the options mentioned above, or may be stored on a combination of these options, or may be stored elsewhere. Also, system 900 may be implemented in a variety of ways. For example, system 900 (excluding display device 905) may be implemented as a single chip or device having a graphics processor, a quad-core central processing unit, and/or a memory controller input/output (I/O) module. In other examples, system 900 (again excluding display device 905) may be implemented as a chipset.

Processor(s) 903 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 904 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 904 also may be implemented via cache memory. In various examples, system 900 may be implemented as a chipset or as a system on a chip.

Figure 10:
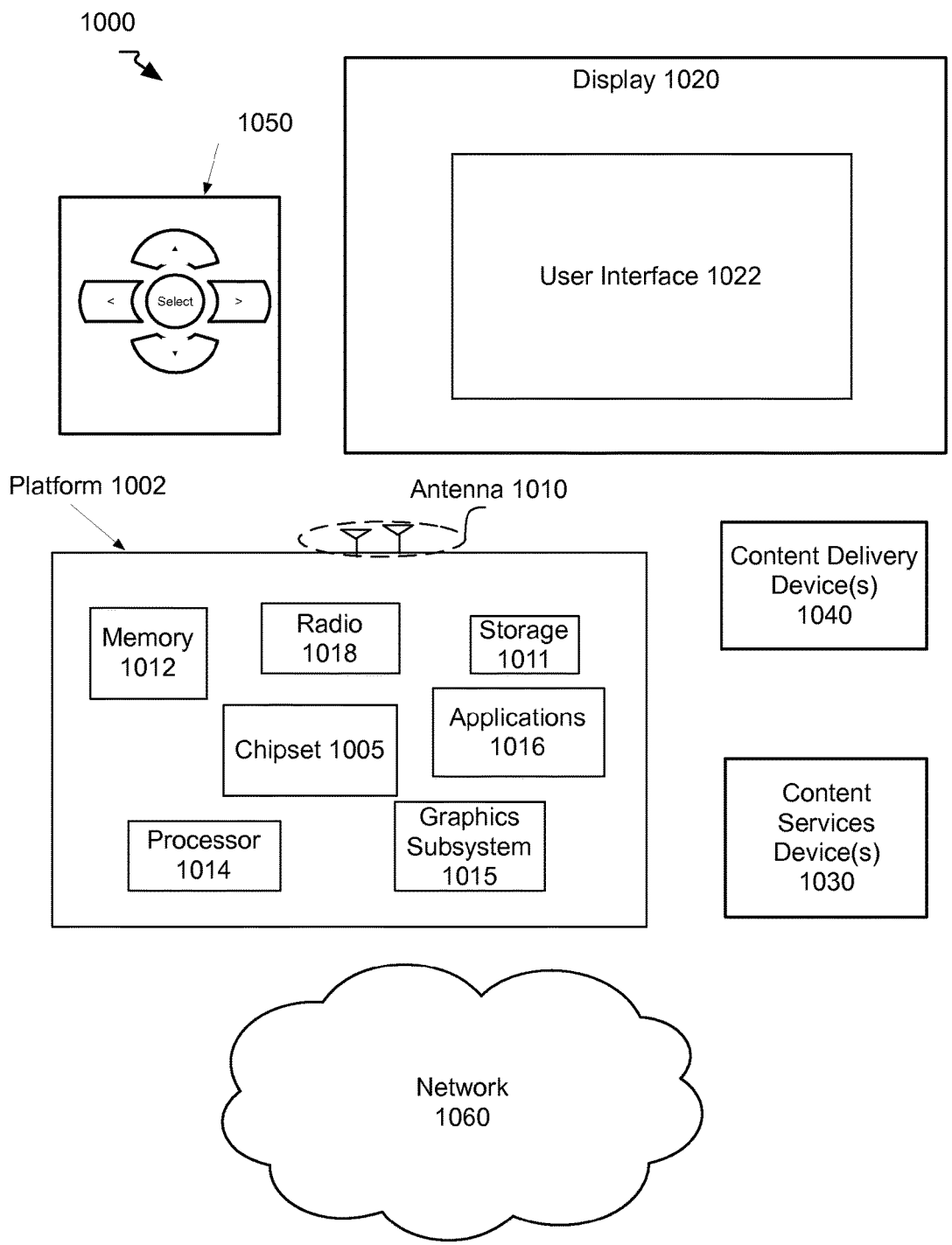
FIG. 10 is an illustrative diagram of another example system.

Referring to FIG. 10, an example system 1000 in accordance with the present disclosure and various implementations, may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 communicatively coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018 as well as antenna(s) 1010. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
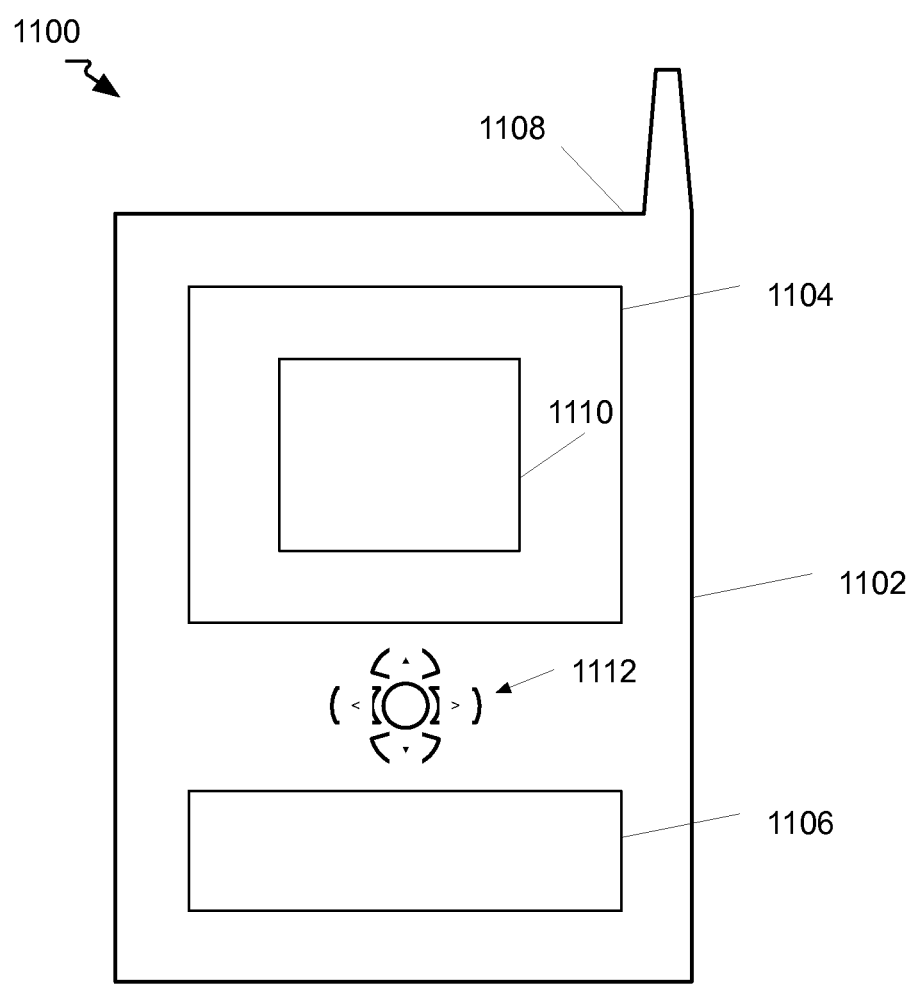
FIG. 11 illustrates another example device, all arranged in accordance with at least some implementations of the present disclosure.

As described above, system 900 or 1000 may be implemented in varying physical styles or form factors. FIG. 11 illustrates implementations of a small form factor device 1100 in which system 900 or 1000 may be implemented. In implementations, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable screen 1110 on a display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one example, a computer-implemented method of receiving image data comprising a syntax having a sequence of symbols to be entropy coded; and updating a previous probability that a symbol will occur in one of the sequences comprising: setting a search range among a set of possible update probability values; setting a first candidate probability for updating the previous probability; searching for at least one more candidate probability in a set of candidate probabilities on a look-up table; and selecting one of the candidate probability values to update the previous probability for coding of the symbol, and selecting based on, at least in part, the bit-cost associated with updating the previous probability with at least one of the candidate probabilities.

By another implementation, the method may comprise that the search range is determined by using a syntax counter that counts the number of 0s and number of 1s used to code a single bit of a syntax after the syntax has been binarized; wherein setting a first candidate probability comprises using a count of the syntax counter to set the first candidate probability; and wherein the first candidate probability is set without regard to bit-cost for updating the previous probability with the first candidate probability. The method comprises generating the look-up table by associating one or more potential candidate probabilities with each update probability value of a plurality of the update probability values, wherein the update probability values form an index for the look-up table; wherein the search range is set by associating the previous probability and the first candidate probability with respective update probability values indexing the look-up table. Also, the method comprises generating the look up table by establishing a range of update probabilities as an index of the look-up table by using initial previous probabilities and corresponding initial first candidate probabilities; generating the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability; limiting the searching to a maximum of three candidate probabilities in addition to the first candidate probability and for each single bit of a syntax; and selecting candidate probabilities based on, at least in part, comparing a new probability based value to a previous probability based value.

The method also may comprise selecting candidate probabilities, at least in part, depending on the results of one of: (1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability; adjusting an initial value of a probability candidate from the look up table depending on a comparison between the initial value and the previous probability based value, and setting the value of the probability candidate by using the difference in a calculation; and performing an early exit comprising using the first candidate probability for updating when a second probability candidate being the first probability candidate selected from the look-up table has a bit-cost larger than or equal to the bit-cost of the first probability candidate; wherein the bit-cost comprises the bit cost to perform the update or the bit-cost to indicate an update is to be performed or both, and in the bitstream.

By a further implementation, a computer-implemented method of entropy decoding for video coding comprising: receiving entropy coded image data associated with a syntax having a sequence of symbols to be entropy decoded; and receiving updated probabilities for performing the entropy decoding and formed by: updating a previous probability that a symbol will occur in one of the sequences comprising: setting a search range among a set of possible update probability values; setting a first candidate probability for updating the previous probability; searching for at least one more candidate probability in a set of candidate probabilities on a look-up table; and selecting one of the candidate probability values to update the previous probability for coding of the symbol, and selecting based on, at least in part, the bit-cost associated with updating the previous probability with at least one of the candidate probabilities.

By yet a further implementation, updating the previous probability may comprise that the search range is determined by using a syntax counter that counts the number of 0s and number of 1s used to code a single bit of a syntax after the syntax has been binarized; wherein setting a first candidate probability comprises using a count of the syntax counter to set the first candidate probability; and wherein the first candidate probability is set without regard to bit-cost for updating the previous probability with the first candidate probability. The updating comprises generating the look-up table by associating one or more potential candidate probabilities with each update probability value of a plurality of the update probability values, wherein the update probability values form an index for the look-up table; wherein the search range is set by associating the previous probability and the first candidate probability with respective update probability values indexing the look-up table. Also, the updating comprises generating the look up table by establishing a range of update probabilities as an index of the look-up table by using initial previous probabilities and corresponding initial first candidate probabilities; generating the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability; limiting the searching to a maximum of three candidate probabilities in addition to the first candidate probability and for each single bit of a syntax; and selecting candidate probabilities based on, at least in part, comparing a new probability based value to a previous probability based value.

The updating of the previous probability also may comprise selecting candidate probabilities, at least in part, depending on the results of one of: (1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability; adjusting an initial value of a probability candidate from the look up table depending on a comparison between the initial value and the previous probability based value, and setting the value of the probability candidate by using the difference in a calculation; and performing an early exit comprising using the first candidate probability for updating when a second probability candidate being the first probability candidate selected from the look-up table has a bit-cost larger than or equal to the bit-cost of the first probability candidate; wherein the bit-cost comprises the bit cost to perform the update or the bit-cost to indicate an update is to be performed or both, and in the bitstream.

By yet another implementation, a computer-implemented system has a display, at least one processor communicatively coupled to the display, at least one memory communicatively coupled to at least one processor and storing image capture data of at least one frame of a video sequence or at least one still photograph, and at least one entropy coding unit communicatively coupled to the at least one processor and being arranged to: receive image data comprising a syntax having a sequence of symbols to be entropy coded; and update a previous probability that a symbol will occur in one of the sequences comprising: set a search range among a set of possible update probability values; set a first candidate probability for updating the previous probability; search for at least one more candidate probability in a set of candidate probabilities on a look-up table; and select one of the candidate probability values to update the previous probability for coding of the symbol, and selecting based on, at least in part, the bit-cost associated with updating the previous probability with at least one of the candidate probabilities.

By another implementation, the search range is determined by using a syntax counter that counts the number of 0s and number of 1s used to code a single bit of a syntax after the syntax has been binarized; wherein setting a first candidate probability comprises using a count of the syntax counter to set the first candidate probability; and wherein the first candidate probability is set without regard to bit-cost for updating the previous probability with the first candidate probability. The entropy coding unit to generate the look-up table by associating one or more potential candidate probabilities with each update probability value of a plurality of the update probability values, wherein the update probability values form an index for the look-up table; wherein the search range is set by associating the previous probability and the first candidate probability with respective update probability values indexing the look-up table. Also, the entropy coding unit to generate the look up table by establishing a range of update probabilities as an index of the look-up table by using initial previous probabilities and corresponding initial first candidate probabilities; generate the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability; limit the searching to a maximum of three candidate probabilities in addition to the first candidate probability and for each single bit of a syntax; and select candidate probabilities based on, at least in part, comparing a new probability based value to a previous probability based value.

The entropy coding unit to select candidate probabilities, at least in part, depending on the results of one of: (1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability; adjust an initial value of a probability candidate from the look up table depending on a comparison between the initial value and the previous probability based value, and setting the value of the probability candidate by using the difference in a calculation; and perform an early exit comprising using the first candidate probability for updating when a second probability candidate being the first probability candidate selected from the look-up table has a bit-cost larger than or equal to the bit-cost of the first probability candidate; wherein the bit-cost comprises the bit cost to perform the update or the bit-cost to indicate an update is to be performed or both, and in the bitstream.

By one approach, at least one computer readable medium having stored thereon instructions that when executed cause a computing device to: receive image data comprising a syntax having a sequence of symbols to be entropy coded; and update a previous probability that a symbol will occur in one of the sequences comprising: set a search range among a set of possible update probability values; set a first candidate probability for updating the previous probability; search for at least one more candidate probability in a set of candidate probabilities on a look-up table; and select one of the candidate probability values to update the previous probability for coding of the symbol, and selecting based on, at least in part, the bit-cost associated with updating the previous probability with at least one of the candidate probabilities.

By another implementation, the search range is determined by using a syntax counter that counts the number of 0s and number of 1s used to code a single bit of a syntax after the syntax has been binarized; wherein setting a first candidate probability comprises using a count of the syntax counter to set the first candidate probability; and wherein the first candidate probability is set without regard to bit-cost for updating the previous probability with the first candidate probability. The instructions cause the computing device to generate the look-up table by associating one or more potential candidate probabilities with each update probability value of a plurality of the update probability values, wherein the update probability values form an index for the look-up table; wherein the search range is set by associating the previous probability and the first candidate probability with respective update probability values indexing the look-up table. Also, the instructions cause the computing device to generate the look up table by establishing a range of update probabilities as an index of the look-up table by using initial previous probabilities and corresponding initial first candidate probabilities; generate the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability; limit the searching to a maximum of three candidate probabilities in addition to the first candidate probability and for each single bit of a syntax; and select candidate probabilities based on, at least in part, comparing a new probability based value to a previous probability based value.

The instructions cause the computing device to select candidate probabilities, at least in part, depending on the results of one of: (1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability; adjust an initial value of a probability candidate from the look up table depending on a comparison between the initial value and the previous probability based value, and set the value of the probability candidate by using the difference in a calculation; and perform an early exit comprising using the first candidate probability for updating when a second probability candidate being the first probability candidate selected from the look-up table has a bit-cost larger than or equal to the bit-cost of the first probability candidate; wherein the bit-cost comprises the bit cost to perform the update or the bit-cost to indicate an update is to be performed or both, and in the bitstream.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of entropy coding for video coding comprising:
   receiving image data comprising a syntax having a sequence of symbols to be entropy coded; and
   updating a previous probability from a previous frame relative to a current frame being entropy encoded that a symbol will occur in one of the sequences comprising:
      setting a search range among a set of possible update probabilities comprising:
         setting a first candidate probability as one end of the search range by using a count of a syntax counter and without regard to bit-cost to update the previous probability, and;
         setting another end of the search range as the previous probability;
      selecting one of the candidate probabilities on a look-up table and within the search range to update the previous probability for coding of the symbol, and selecting based on, at least in part, the bit-cost associated with updating the previous probability with at least one of the candidate probabilities; and
      updating the previous probability by using the selected candidate probability.

2. The method of claim 1 wherein the search range is determined by using a syntax counter that counts the number of 0s and number of 1s used to code a single bit of a syntax after the syntax has been binarized.

3. The method of claim 2 wherein the syntax counter uses a left counter and a right counter based on a tree structure.

4. The method of claim 1 comprising generating the look-up table by associating one or more potential candidate probabilities with each update probability value of a plurality of the update probability values, wherein the update probability values form an index for the look-up table.

5. The method of claim 4 wherein the search range is set by associating the previous probability and the first candidate probability with respective update probability values indexing the look-up table.

6. The method of claim 4 comprising generating the look up table by establishing a range of update probabilities as an index of the look-up table by using initial previous probabilities and corresponding initial first candidate probabilities.

7. The method of claim 1 comprising generating the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability.

8. The method of claim 1 comprising limiting the searching to a maximum of three candidate probabilities in addition to the first candidate probability and for each single bit of a syntax.

9. The method of claim 1 comprising selecting candidate probabilities based on, at least in part, comparing a new probability based value to a previous probability based value.

10. The method claim 9 comprising, selecting candidate probabilities, at least in part, depending on the results of one of:
   (1) determining the difference between the new probability based value and a candidate probability from the look up table selected by using the new probability based value as an index number to look up the candidate probability; and
   (2) determining the difference between (a) a change value based on, at least in part, the difference between the new probability and the previous probability, and (b) a candidate probability from the look up table selected by using the change value as an index number to look up the candidate probability.

11. The method of claim 10 comprising adjusting an initial value of a probability candidate from the look up table depending on a comparison between the initial value and the previous probability based value, and setting the value of the probability candidate by using the difference in a calculation.

12. The method of claim 1 comprising performing an early exit comprising using the first candidate probability for updating when a second probability candidate being the first probability candidate selected from the look-up table has a bit-cost larger than or equal to the bit-cost of the first probability candidate.

13. The method of claim 1 wherein the bit-cost comprises the bit cost to perform the update or the bit-cost to indicate an update is to be performed or both, and in the bitstream.

14. The method of claim 1 wherein the search range is determined by using a syntax counter that counts the number of 0s and number of 1s used to code a single bit of a syntax after the syntax has been binarized;
   the method comprising generating the look-up table by associating one or more potential candidate probabilities with each update probability value of a plurality of the update probability values, wherein the update probability values form an index for the look-up table;
   wherein the search range is set by associating the previous probability and the first candidate probability with respective update probability values indexing the look-up table;
   the method comprising:
      generating the look up table by establishing a range of update probabilities as an index of the look-up table by using initial previous probabilities and corresponding initial first candidate probabilities;
      generating the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability;
      limiting the searching to a maximum of three candidate probabilities in addition to the first candidate probability and for each single bit of a syntax;
      selecting candidate probabilities based on, at least in part, comparing a new probability based value to a previous probability based value;
      selecting candidate probabilities, at least in part, depending on the results of one of:
         (1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability;

adjusting an initial value of a probability candidate from the look up table depending on a comparison between the initial value and the previous probability based value, and setting the value of the probability candidate by using the difference in a calculation; and performing an early exit comprising using the first candidate probability for updating when a second probability candidate being the first probability candidate selected from the look-up table has a bit-cost larger than or equal to the bit-cost of the first probability candidate;

wherein the bit-cost comprises the bit cost to perform the update or the bit-cost to indicate an update is to be performed or both, and in the bitstream.

15. A computer-implemented method of entropy decoding for video coding comprising:

receiving entropy coded image data associated with a syntax having a sequence of symbols to be entropy decoded; and receiving updated probabilities for performing the entropy decoding and formed by:

updating a previous probability from a previous frame relative to a current frame being entropy encoded that a symbol will occur in one of the sequences comprising:

setting a search range among a set of possible update probabilities comprising:

setting a first candidate probability as one end of the search range by using a count of a syntax counter and without regard to bit-cost to update the previous probability, and;

setting another end of the search range as the previous probability;

selecting one of the candidate probabilities on a look-up table and within the search range to update the previous probability for coding of the symbol, and selecting based on, at least in part, the bit-cost associated with updating the previous probability with at least one of the candidate probabilities; and updating the previous probability by using the selected candidate probability.

16. The method of claim 15 wherein the search range is determined by using a syntax counter that counts the number of 0s and number of 1s used to code a single bit of a syntax after the syntax has been binarized;

the updated probabilities formed by generating the look-up table by associating one or more potential candidate probabilities with each update probability value of a plurality of the update probability values, wherein the update probability values form an index for the look-up table;

wherein the search range is set by associating the previous probability and the first candidate probability with respective update probability values indexing the look-up table;

the updated probabilities formed by:

generating the look up table by establishing a range of update probabilities as an index of the look-up table by using initial previous probabilities and corresponding initial first candidate probabilities;

generating the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability;

limiting the searching to a maximum of three candidate probabilities in addition to the first candidate probability and for each single bit of a syntax;

selecting candidate probabilities based on, at least in part, comparing a new probability based value to a previous probability based value;

selecting candidate probabilities, at least in part, depending on the results of one of:

(1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability;

adjusting an initial value of a probability candidate from the look up table depending on a comparison between the initial value and the previous probability based value, and setting the value of the probability candidate by using the difference in a calculation; and performing an early exit comprising using the first candidate probability for updating when a second probability candidate being the first probability candidate selected from the look-up table has a bit-cost larger than or equal to the bit-cost of the first probability candidate;

wherein the bit-cost comprises the bit cost to perform the update or the bit-cost to indicate an update is to be performed or both, and in the bitstream.

17. A computer-implemented system comprising:

at least one display;

at least one memory;

at least one processor communicatively coupled to the memory and display; and at least one entropy coding unit communicatively coupled to the at least one processor and being arranged to:

receive image data comprising a syntax having a sequence of symbols to be entropy coded; and update a previous probability from a previous frame relative to a current frame being entropy encoded that a symbol will occur in one of the sequences comprising:

set a search range among a set of possible update probabilities comprising:

set a first candidate probability as one end of the search range by using a count of a syntax counter and without regard to bit-cost to update the previous probability, and;

set another end of the search range as the previous probability;

select one of the candidate probabilities on a look-up table and within the search range to update the previous probability for coding of the symbol, and selecting based on, at least in part, the bit-cost associated with updating the previous probability with at least one of the candidate probabilities; and update the previous probability by using the selected candidate probability.

18. The system of claim 17 wherein the search range is determined by using a syntax counter that counts the number of 0s and number of 1s used to code a single bit of a syntax after the syntax has been binarized.

19. The system of claim 18 wherein the syntax counter uses a left counter and a right counter based on a tree structure.

20. The system of claim 17 comprising generating the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability.

21. The system of claim 17 wherein the motion estimation unit is arranged to: wherein the search range is determined by using a syntax counter that counts the number of 0s and number of 1s used to code a single bit of a syntax after the syntax has been binarized;

the entropy coding unit being arranged to:
generate the look-up table by associating one or more potential candidate probabilities with each update probability value of a plurality of the update probability values, wherein the update probability values form an index for the look-up table;

wherein the search range is set by associating the previous probability and the first candidate probability with respective update probability values indexing the look-up table;

the entropy coding unit being arranged to:
generate the look up table by establishing a range of update probabilities as an index of the look-up table by using initial previous probabilities and corresponding initial first candidate probabilities;

generate the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability;

limit the searching to a maximum of three candidate probabilities in addition to the first candidate probability and for each single bit of a syntax;

select candidate probabilities based on, at least in part, comparing a new probability based value to a previous probability based value;

select candidate probabilities, at least in part, depending on the results of one of:

(1) determining the difference between the new probability based value and a candidate probability from the look up table selected by using the new probability based value as an index number to look up the candidate probability, and (2) determining the difference between (a) a change value based on, at least in part, the difference between the new probability and the previous probability, and (b) a candidate probability from the look up table selected by using the change value as an index number to look up the candidate probability;

adjust an initial value of a probability candidate from the look up table depending on a comparison between the initial value and the previous probability based value, and setting the value of the probability candidate by using the difference in a calculation; and perform an early exit comprising using the first candidate probability for updating when a second probability candidate being the first probability candidate selected from the look-up table has a bit-cost larger than or equal to the bit-cost of the first probability candidate;

wherein the bit-cost comprises the bit cost to perform the update or the bit-cost to indicate an update is to be performed or both, and in the bitstream.

22. At least one non-transitory computer-readable medium having stored thereon instructions that when executed cause a computing device to:

receive image data comprising a syntax having a sequence of symbols to be entropy coded; and update a previous probability from a previous frame relative to a current frame being entropy encoded that a symbol will occur in one of the sequences comprising:

set a search range among a set of possible update probabilities comprising:

set a first candidate probability as one end of the search range by using a count of a syntax counter and without regard to bit-cost to update the previous probability, and set another end of the search range as the previous probability;

select one of the candidate probabilities on a look-up table and within the search range to update the previous probability for coding of the symbol, and selecting based on, at least in part, the bit-cost associated with updating the previous probability with at least one of the candidate probabilities; and update the previous probability by using the selected candidate probability.

23. The computer-readable medium of claim 22 wherein the motion estimation unit is arranged to: wherein the search range is determined by using a syntax counter that counts the number of 0s and number of 1s used to code a single bit of a syntax after the syntax has been binarized;

the instructions cause the computing device to:
generate the look-up table by associating one or more potential candidate probabilities with each update probability value of a plurality of the update probability values, wherein the update probability values form an index for the look-up table;

wherein the search range is set by associating the previous probability and the first candidate probability with respective update probability values indexing the look-up table;

the instructions cause the computing device to:
- generate the look up table by establishing a range of update probabilities as an index of the look-up table by using initial previous probabilities and corresponding initial first candidate probabilities;
- generate the look-up table by selecting the candidate probabilities for each update probability indexing the look-up table by selecting the probabilities from an initial range of probabilities for placement on the look-up table, wherein the selected candidate probabilities assigned to an update probability (1) each have different probability update costs relative to each other, and (2) have a probability value closest to the update candidate value that is an initial first candidate probability;
- limit the searching to a maximum of three candidate probabilities in addition to the first candidate probability and for each single bit of a syntax;
- select candidate probabilities based on, at least in part, comparing a new probability based value to a previous probability based value;
- select candidate probabilities, at least in part, depending on the results of one of:
  - (1) determining the difference between the new probability based value and a candidate probability from the look up table selected by using the new probability based value as an index number to look up the candidate probability, and
  - (2) determining the difference between (a) a change value based on, at least in part, the difference between the new probability and the previous probability, and (b) a candidate probability from the look up table selected by using the change value as an index number to look up the candidate probability;
- adjust an initial value of a probability candidate from the look up table depending on a comparison between the initial value and the previous probability based value, and setting the value of the probability candidate by using the difference in a calculation; and
- perform an early exit comprising using the first candidate probability for updating when a second probability candidate being the first probability candidate selected from the look-up table has a bit-cost larger than or equal to the bit-cost of the first probability candidate;
- wherein the bit-cost comprises the bit cost to perform the update or the bit-cost to indicate an update is to be performed or both, and in the bitstream.

* * * * *